INVENTORS
MORRIS R. HICKS &
JOSEPH C. LeVEQUE

ATTORNEY

INVENTORS
MORRIS R. HICKS &
JOSEPH C. LeVEQUE
BY

*Arthur H. Van Horn*
ATTORNEY

United States Patent Office 3,447,220
Patented June 3, 1969

3,447,220
SELECTIVE FLUIDIC CONTROL AND ACTUATING MEANS FOR MACHINE TOOLS
Morris R. Hicks, Brook Park, and Joseph C. Le Veque, Cleveland, Ohio, assignors to Bardons & Oliver, Inc., Cleveland, Ohio, a corporation of Ohio
Filed July 10, 1967, Ser. No. 652,127
Int. Cl. B23b 3/16
U.S. Cl. 29—42    14 Claims

ABSTRACT OF THE DISCLOSURE

A machine tool employing a fluidic amplifier system for controlling and actuating in selected sequence a plurality of steps in an automatic cycle of the machine as well as during a manual cycle of operation. More particularly, the invention is directed to means whereby the selected programming of the cycle may be set up at a central control console conveniently located for the operator and sequentially executed through the actuation of relatively high fluid pressure responsive to relatively low pressure fluidic signals, for example, of about ⅛ p.s.i. or less, selectively imposed on said relatively high fluid pressure which is in turn directed to hydraulic pressure distribution means for actuating and/or controlling means or mechanisms of the machine to be activated.

The invention

Machine tools employing tool indexing, tool slide and/or cross slide approach, feed and return functions, as well as other operations such, for example, as turret lathes, have been subject to interrupted operation and consequent time loss, are relatively complicated and costly in design, construction, maintenance and operation, and for the most part are not readily accessible for repair or maintenance.

The present invention applied to such machines employs low pressure fluid as a fluidic signal means for actuating relatively higher fluid pressure circuits in automatically carrying out a preselected program of one or more operations or functions to be effected by the machine, and in preselected sequences, in response to the selected programming set-up at the console, or if desired, a manual programming may be carried out. The invention, therefore, provides for extremely low pressure fluidic relay means (TA) to control a relatively high fluid pressure system in carrying out its cycle of operation as well as including means for the imposition of selected fluidic signal time delay actuated means (TD) in performing certain areas of the programmed cycle. Such devices as are designated TA are of the laminar fluid stream type and those designated TD herein may be of the turbulence or non-turbulence type. By virtue of this organization of means in the pneumatic circuitry, resultant savings in initial construction costs, as well as in maintenance and operational costs, are extremely advantageous.

Furthermore, by virtue of this invention, the flexibility of the machine in the selection of functions to be performed and in carrying them out effectively is materially increased over such machines which have depended entirely upon electric or hydraulic systems for power in performing their functions.

The invention disclosed herein employs the use of relatively low constant pressure fluidic signals of the order of about ⅟₃₀ to ½ or 1 p.s.i. administered from a source as input signals through turbulence amplifiers or relays to control the output thereof of a relatively higher fluidic pressure signal of the order of approximately ⅟₇ to ⅟₁₄ p.s.i. which, in turn, is amplifed in the range of 60–80 p.s.i. through jet amplifiers (JA) and pilot valves (PV). Conventional hydraulic pressure means and distribution systems responsive to the presence or absence of initial low pressure fluidic signals, as will appear hereinafter, supply the ultimate means for conveying operating power to the mechanically moving parts of the machine.

The drawings

FIGURE 7 illustrates specifically in diagrammatic form the fluidic-pneumatic circuitry which exists when the turret slide begins its forward rapid traverse;

FIGURE 8 shows the condition of forward feed of the turret slide after rapid forward traverse has been accomplished. It will be noted that the circuitry is substantially the same as in FIGURE 6 except as will appear from the detailed description of FIGURE 8;

FIGURE 9 represents the condition during RETURN-RAPID of the turret slide;

FIGURE 10 represents the condition during RETURN-HOLD of the turret slide;

FIGURE 11 represents the condition during STOP of the turret slide;

FIGURE 12 represents the cross slide stopped on PARK;

FIGURE 13 represents the cross slide in RAPID-IN condition;

FIGURE 14 represents the cross slide in FEED-IN condition; and

FIGURE 15 represents the cross slide in RAPID-OUT condition.

In carrying out the invention as disclosed herein with particular reference to the accompanying drawings, there is provided a remote control console C, preferably as a unit in itself, but having operative communication with the machine and its several mechanisms to be controlled in carrying out preselected functions as programmed by the operator for either automatic or manual operation.

Figure 1:
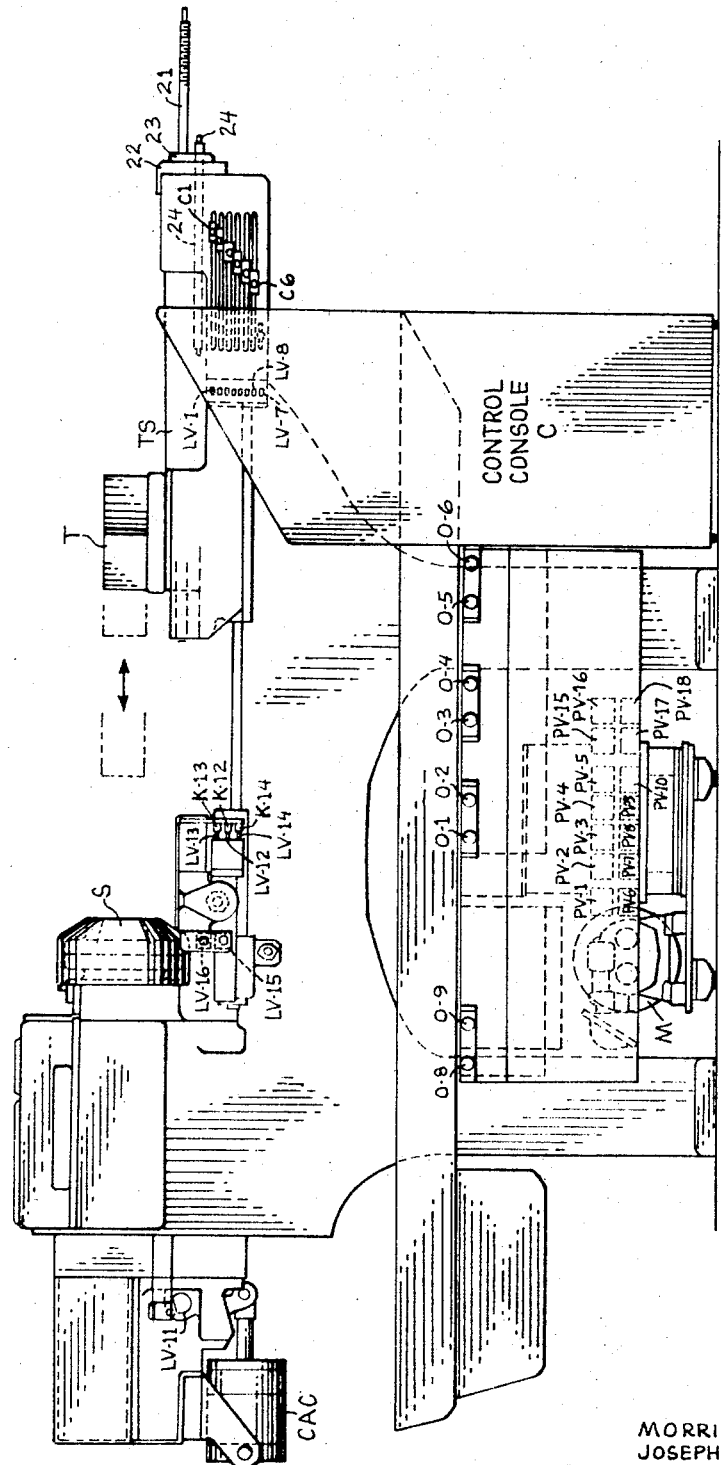
FIGURE 1 is a front elevation of a turret lathe to which the present invention is applied and shows the turret index control station on the turret slide, cross slide control station, as well as other fluidic controls and the master control station or console.
Figure 2:
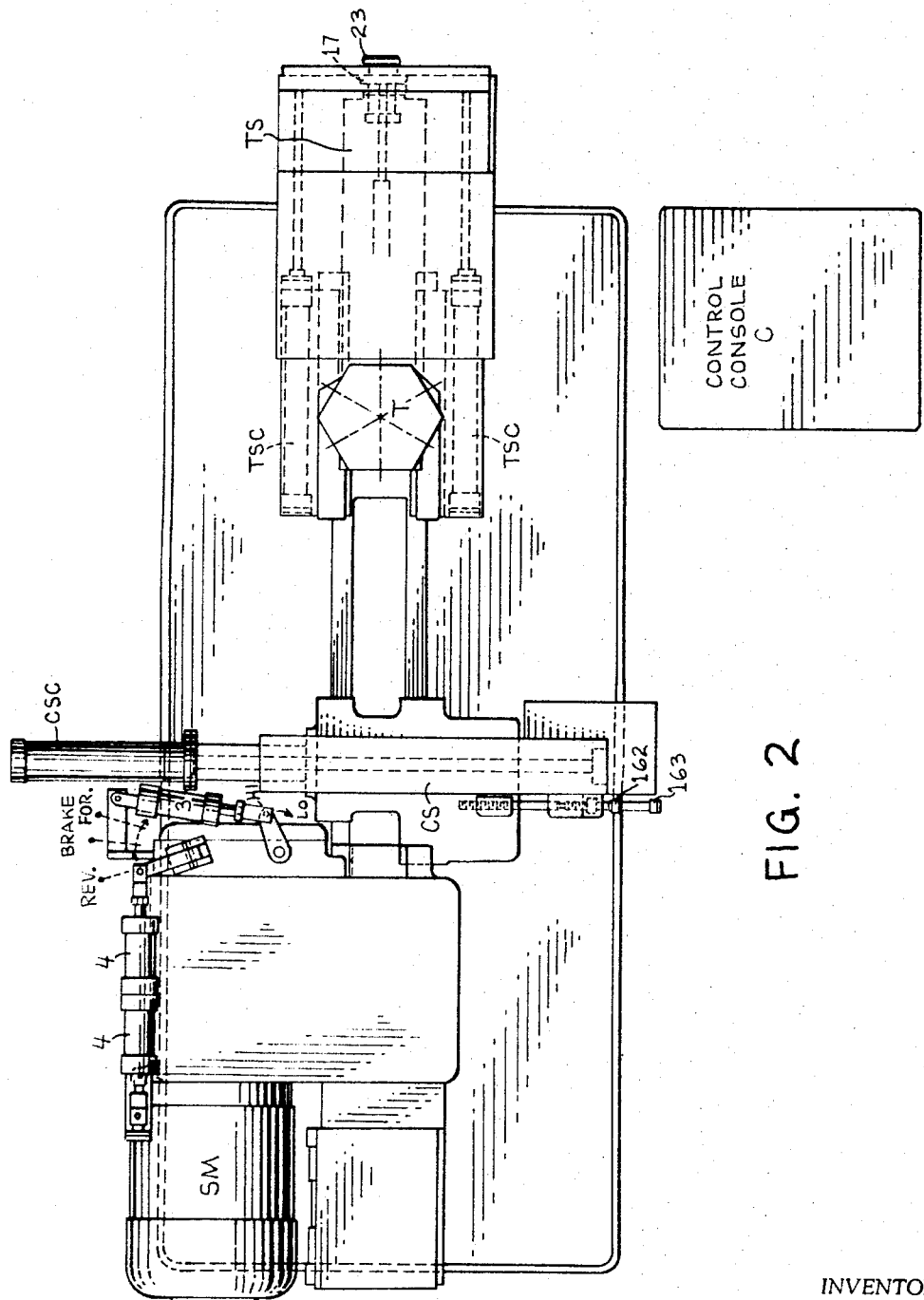
FIGURE 2 is a top plan view of the machine.
Figure 3:
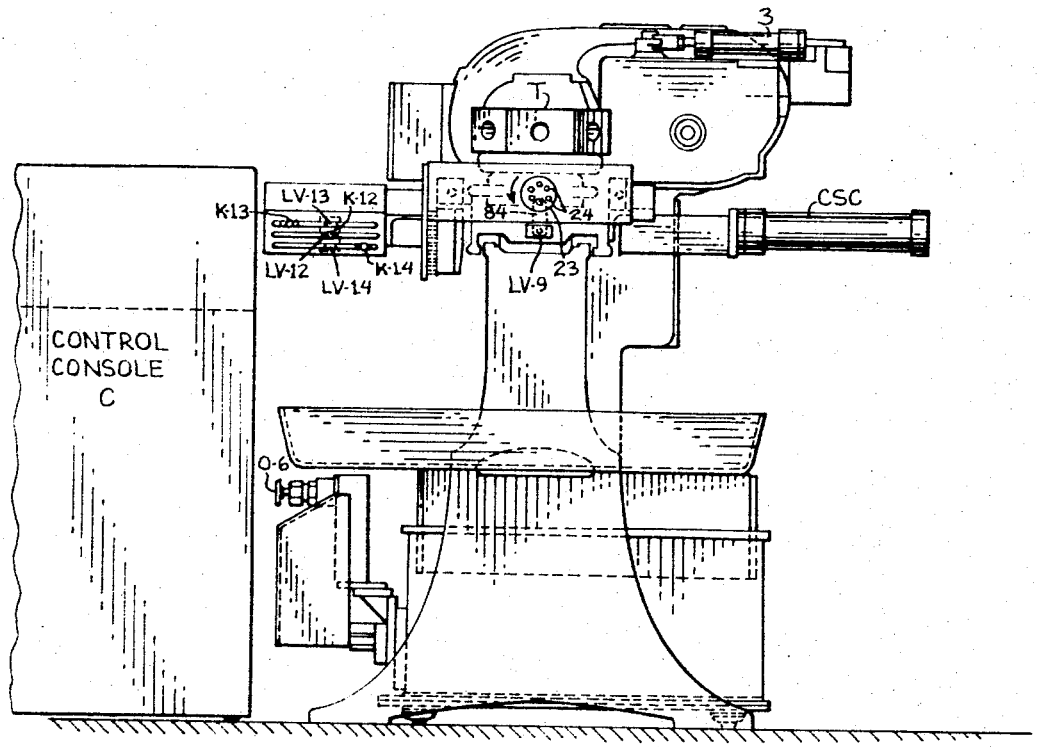
FIGURE 3 is an end view as viewed from right to left in FIGURE 2.

First referring to FIGURES 1, 2 and 3, the two speed HI-LO motor SM provides power to the spindle S. The turret slide TS is slidably carried on a saddle and mounts a tool turret T rotatable to selectively present its several faces to the axis of and facing the spindle. A cross slide CS, having "in" and "out" movement across the spindle axis is powered by a hydraulic motor CSC. The turret slide is also powered by a pair of hydraulic motors TSC.

Figure 6:
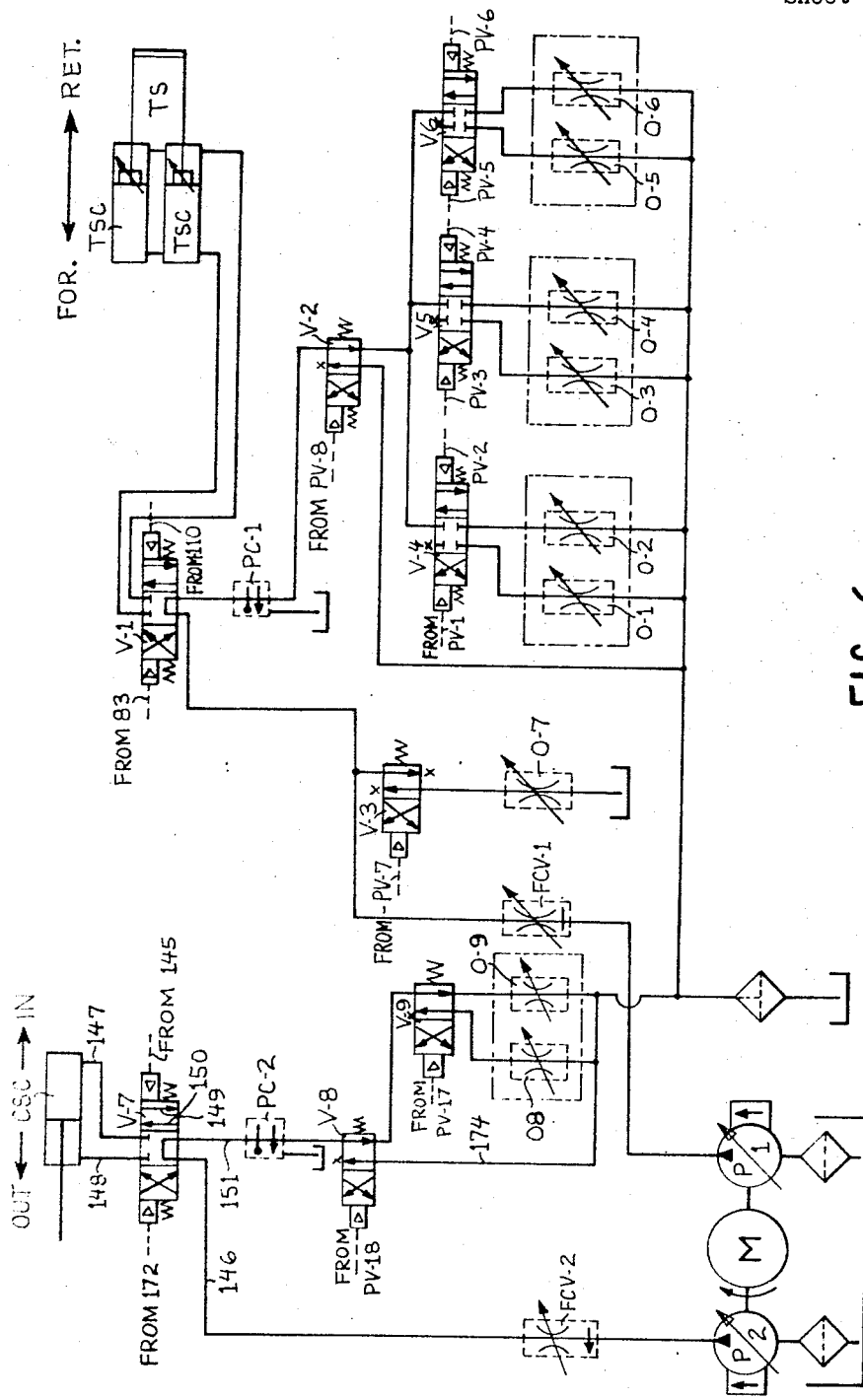
FIGURE 6 illustrates initial relatively high pressure sources and circuitry supplying higher hydraulic pressure to the turret slide circuit, and intermediate fluid pressure for cross slide operation.

The turret slide hydraulic motor TSC and the cross slide hydraulic motor CSC each derive their power from hydraulic pressure generated by pumps P–1 and P–2 driven by motor M, as illustrated diagrammatically in FIGURE 6. This hydraulic pressure is delivered to the slide motors through flow control valves FCV–1 and FCV–2, respectively.

Figure 4:
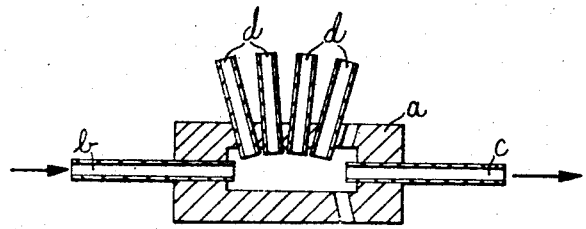
FIGURE 4 is a diagrammatic view representing a form of turbulence amplifier or fluidic relay TA.

In FIGURE 4, a fluidic amplifier or relay (TA) of a commercial type employed for use in this invention is illustrated diagrammatically as comprising a vented capsule or housing $a$ having spaced apart axially aligned input and output tubes $b$ and $c$, respectively, through which an intermediate pneumatic fluid pressure flow is directed, but which flow may be interrupted by the impingement of a transversely directed fluidic low pressure signal entering through one or more of the input tubes $d$ which are supplied from a manifold, whereby the output of tube $c$ is reduced to zero pressures, as will later appear.

Figure 5:
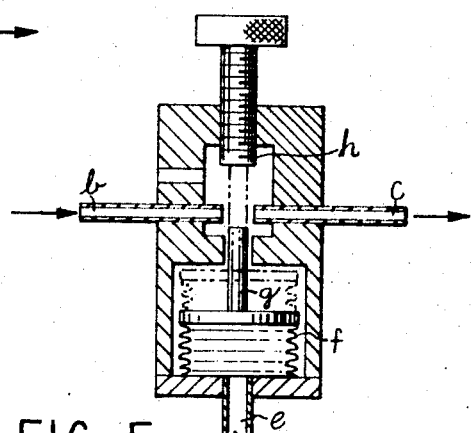
FIGURE 5 is a diagrammatic view representing a form of fluidic time delay device TD.

In FIGURE 5, a fluidic time delay device (TD) is diagrammatically shown which operates on substantially the same general principle as that of the amplifier or relay (TA), with the exception that a low pressure fluidic signal is supplied to the input tube $e$ to expand the bellows $f$ and thus raise the stem $g$ into the path of pneumatic pressure flow in tubes $b$ and $c$, thus interrupting the output from tube $c$. The limit of movement of the stem $g$ to engage the adjustable stop $h$ determines the time delay period in returning the bellows by gravity to its collapsed condition after the input low pressure signal in tube $c$ has been removed.

Low pressure input signals to both the devices illustrated in FIGURES 4 and 5 and elsewhere in the drawings are characterized as having substantially constant pressure.

Reference in the following description and, as shown in the drawings, is also made to fluidic jet amplifiers (JA) and pilot valves (PV). Jet amplifiers are of a type which are in principle similar to fluidic turbulence amplifiers or relays, but differ therefrom in that a mechanical interrupter in the inlet-outlet stream of fluid pressure is actuated in response to a low pressure input fluidic signal. Jet amplifiers (JA) and the time delay (TD) devices employed in this invention are both of the mechanically interrupted type and, as such, function effectively on low pressure laminar fluid stream flow, and on relatively higher pressure function effectively where the fluid stream flow is of the turbulent type. Such devices are more specifically disclosed, per se, in an application about to be filed.

Pilot valves (PV) such as those employed in the present fluid circuitry are of conventional design and serve to relay fluid pressure outputs of certain jet amplifiers employed to deliver increased fluid pressure from the jet amplifier to effectively energize the higher pressure hydraulic circuits whereby to deliver sufficient power to motivate such mechanical movements as turret indexing, turret slide and cross slide movements in response to initial fluidic signals of very low p.s.i.

Next, referring to FIGURES 7 through 11, these figures show in diagrammatic form sources of relatively high and low fluid pressure systems, the distribution and control of such systems, and the means effecting such distribution and controls whereby to accomplish the functions of the machine's component parts to the end that a selected program may be efficiently and effectively carried out manually or automatically with maximum ease and convenience to the operator. In these diagrammatic figures, relatively high air pressure (e.g., 60–150 p.s.i.) is delivered at 1 from a source of conventional air pressure supply (not shown) in part to a regulator 2 and thence to supply air pressure to a HI-LO speed clutch control 3 for the spindle and to a three-position forward, reverse and spindle-brake control 4. Another line 5 leads from the source of conventional air supply to the pressure regulations 6 and 7. The output from regulator 6 delivers fluid pressure to the manifold 8 having outlets for connection with a series of air pilot valves which will be described hereinafter. Air pressure from regulator 7 is delivered to a manifold 9 for distribution, as will also be described hereinafter. Another line 10 leading from the regulator 7 is filtered at 11 and is delivered to a manifold 12 for distribution through the pressure regulator 13 to the turret face selector 17; through regulator 14 to the manifold 18 which distributes air pressure to control devices on the panel of the console C; and regulators 15 and 16 to the manifolds 19 and 20, respectively, which have outlets for connection with certain low pressure turbulence amplifiers in the turret logic circuits, brake, clutch and forward and reverse circuits and with the cross slide and spindle collet circuits, as will presently appear.

*Turret indexing and turret slide operation*

As explained above, air pressure is delivered to the turret face selector 17, through a line 21. The turret face selector is carried by the rear end of the turret slide within a housing 22 and rotates with a stop screw roll 23 which carries a plurality of stop screws 24, the same in number as the positions or stations through which the turret is operable.

Figure 7:
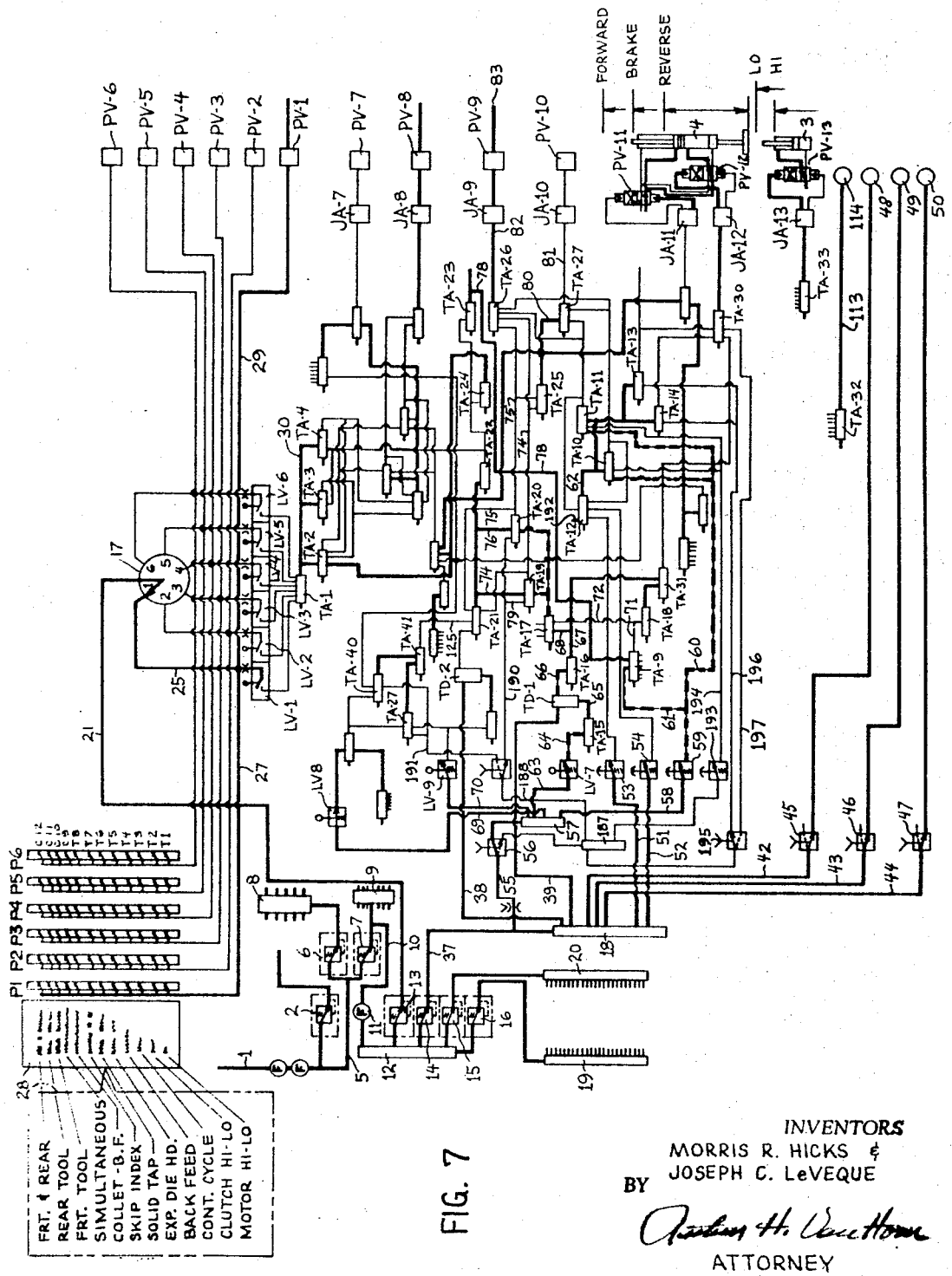
FIGURES 7 through 12 are schematic diagrams of the fluidic-pneumatic turret circuitry employed and FIGURES 13 through 15 show the cross slide fluidic-pneumatic circuitry. In each instance, zero pressure is indicated by light lines; signal present by heavy lines; and momentary signal necessary to shift circuit to a condition is shown in broken lines in certain figures.

The indexing turret as shown is movable through six stations equally located on the periphery of the turret. ON-OFF valves are provided in a plurality of vertical series, one for each station or turret face, these values being diagrammatically shown in FIGURES 7 through 11. Each of the series of these valves is housed within the console and is actuated by respective actuating means such as manually operated buttons or push-pull devices arranged on the panel 28. The valves of the respective series are also arranged in a horizontal alignment, as shown, in these figures and, as such, correspond to functions selected to be performed as shown in the panel area opposite each of these horizontal rows of valves. The vertical series in each instance correspond to the particular function which may be selected as part of a programming for one or more selected turret faces. For example, as shown in FIGURE 7, via the heavy lines, it will be noted that position P–1 of the turret selector is supplied with air pressure through the line 21 and delivers air pressure through line 25 to limit valve LV–1, there being a connection from line 25 also through line 27 to the vertical series of ON-OFF valves in column P–1 supplying air pressure to each of the valves in this column. Under these conditions, face 1 of the turret will be facing the work in the spindle collet. The selector function to be carried out by the machine, for the turret face in this position, is determined by a selected manual control which is depressed by the operator on the panel 28. This same kind of determination of the function or functions and the selection of the work position of the turret to carry out such function is equally selective for any working face of the turret depending upon its working position with respect to the collet, as will readily be seen by the independent air pressure lines leading from the turret face selector to a respective limit valve connected with each respective station of the turret. Line 27 also is connected through line 29 with one of a series of pilot valves PV–1. In a similar manner, the vertical columns P–1, P–2, P–3, P–4, P–5 and P–6, representing the respective working faces of the turret, are connected with their respective limit valves LV–1, LV–2, LV–3, LV–4, LV–5 and LV–6 and also respectively with the pilot valves PV–1, PV–2, PV–3, PV–4, PV–5 and PV–6.

The outputs from PV–1 through PV–6 communicate with valves V–4, V–5 and V–6, respectively, to actuate them in opposite directions, as illustrated in FIGURE 6, thereby providing for hydraulic fluid discharged from the turret slide cylinders TSC through valves V–1, pressure compensator valves PV–1 and V–2. Hydraulic fluid discharged from V–4, V–5 or V–6, depending upon the position of these respective valves as positioned by any one of PV–1 through PV–6 corresponding to the working position of the respective turret faces, will be delivered through corresponding orifices O–1 through O–6 and thence to the sump.

Figure 8:
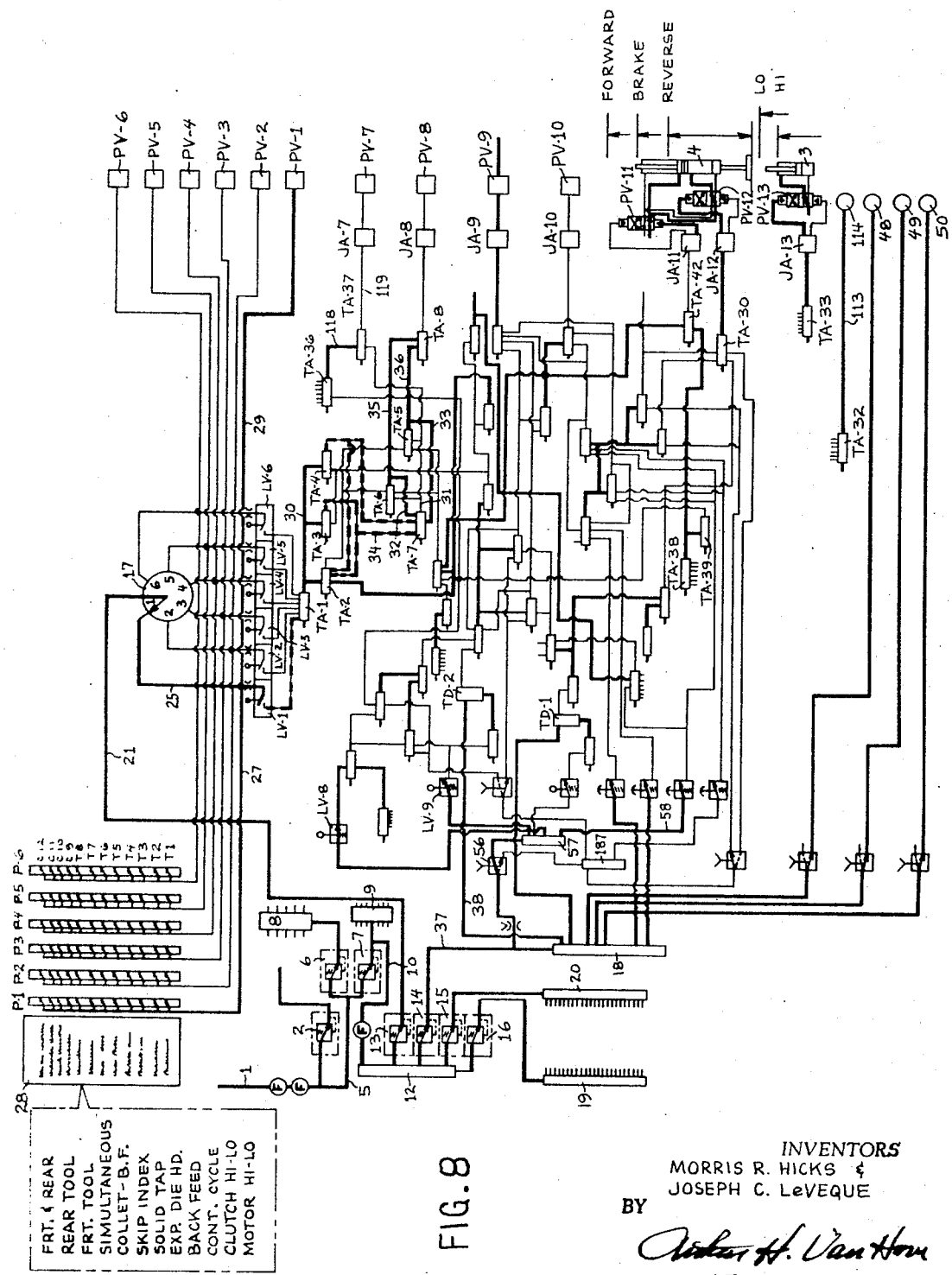

Referring more particularly to FIGURE 7, the diagramatic showing therein illustrates in solid lines those portions of the circuitry which are under working pressure while the turret is at its first station for forward rapid traverse, preliminary to forward feed which is illustrated in FIGURE 8 in which the fluid pressure circuitry is shown in broken lines, indicating a momentarily active circuit and in solid lines those portions of the circuit which are under full pressure conditions. The forward feed motion is initiated by a momentary closure of the limit valve LV–1 which interrupts the input pressure flow through the turbulence amplifier TA–1 as long as the valve LV–1 is depressed. Limit valve LV–1 is shown in FIGURE 1 which is actuated by one or a plurality of adjustable cams carried by the turret slide, as indicated at C–1, as the slide reaches the limit of its forward rapid motion and enters the forward feed portion of its forward motion. This occurs when the cam overrides the limit valve LV–1 momentarily. Under these conditions, the momentary interruption of TA–1 will momentarily interrupt fluid pressure normally supplied through line 30 which feeds fluid pressure to the turbulence amplifiers TA–2, TA–3 and TA–4. As cam C–1 passes the limit valve LV–1, fluid pressure is reestablished in line 30 and to turbulence amplifiers TA–2, TA–3 and TA–4. Momentary interruption of the signal occurs only so long as the limit valve is depressed.

During the interval when line 30 is deenergized, there occurs a momentary output from the turbulence amplifiers TA–3 and TA–4 which is directed in part from TA–4 to TA–2 and in part from TA–3 to TA–2 which provides a safety factor in assuring that there is no live output from TA–2 to TA–5 and TA–6, which will be referred to in more detail hereinafter. The outputs of TA–3 and TA–4 are also connected as inputs to TA–7. Substantially simultaneously with the beginning of the momentary inputs to TA–7, TA–6 will deliver input pressure through line 32 to TA–7. In addition to the feed back 32 from TA–6 to TA–7, there is also established a feed back from TA–5 to TA–7, as indicated at 33. Thus, as the momentary signal is indicated by the input 34 to TA–7, the inputs 32 and/or 33 will establish a safeguard against reenergization of the output 31 to TA–7 unless removed by a subsequent shift signal.

The outputs from TA–6 and TA–5 also lead through lines 35 and 36 which supply fluid pressure to TA–8 which renders the output from TA–8 OFF thereby establishing a condition in hydraulic valve V–2 to allow shift to FEED.

Referring again to FIGURE 7 of the drawing, pneumatic fluid pressure is supplied through a line 37 from the pressure regulator 14 and is delivered to manifold 18. Lines 38 and 39 leading from the manifold supply fluid pressure to the time delay units 40 and 41, respectively, whereas lines 42, 43 and 44 supply fluid pressure from the manifold 18 through the manual selectors 45, 46 and 47, respectively, to the pressure switches 48, 49 and 50, respectively, to electrically turn OFF or ON the main spindle drive motor, the motor M for driving hydraulic pumps, as shown in FIGURE 6, and a coolant pump motor, respectively.

Lines 51 and 52 lead to manually operated spring loaded ON and OFF valves 53 and 54. A fluid pressure line 55 leads from the line 37 to a manually operated selector valve 56 which, when in the position shown in full lines, delivers fluid pressure to the manifold 57. As the selector valve 56 is shown in the heavy line position, it is set for automatic control of the machine whereas in the dotted line position, it indicates the position of the valve for manual operation of the machine.

A line 58 leads from the manifold 57 to the manually operated spring loaded START button 59 which is shown in open position but when depressed, supplies fluid pressure momentarily to the lines 60 and 61 and from line 60 to TA–9, TA–10 and TA–11. While the START valve is depressed, it opens the momentary flow of fluid pressure through line 60 and line 61 which blocks the output from TA–10 and TA–11 and establishes an output from TA–12, as indicated by the heavy line 62 which delivers input fluid pressure to TA–10, TA–11, TA–13 and TA–14. Under these conditions, TA–10, TA–11, TA–13 and TA–14 will be OFF.

Also leading from the manifold 57 is a line 63 which supplies fluid pressure to a spring loaded limit valve LV–7 which, when depressed and released, delivers a momentary signal through line 64 to TA–15, the output 65 of which is turned off under the influence of the momentary signal, but after a predetermined time delay effected by TD–1, the momentary signal begins and energizes line 66 at the termination of the selected time delay period. Under these conditions, the momentary output 66 of TD–1 is established to deliver fluid pressure to TA–16 which closes output 67. Line 68 furnishes fluid pressure from line 67 to TA–17, but during the momentary signal in line 66, the flow of fluid pressure through 67 and 68 is terminated. During the momentary signal in line 61, the output of TA–9 is blocked.

Leading from the manifold 57 is a fluid pressure line 69 supplying fluid pressure to a manually operated spring loaded limit valve LV–8 which is employed as a skip index control which will be referred to later on in connection with the description of the functions represented by the series of valves horizontally in alignment with the indicated function to be performed, as indicated in panel 28 for any one of a plurality of the turret face vertical series as shown in the upper left-hand corner of FIGURE 7. Line 70 also supplies fluid pressure from the manifold 57 and delivers the same to a spring loaded manually operated limit valve LV–9.

As stated before, FIGURES 7 through 11 show the general fluidic-pneumatic circuit layout, but in referring to FIGURE 7 in particular, at this point it shows that a momentary pneumatic pulse is set up in lines 60 and 61 by an operator depressing the START button 59. This pulse being of a momentary nature is sufficient to deactivate TA–9, TA–10, and TA–11 and establishes zero pressure in the output 71 and consequently line 72 leading to TA–17. When limit valve LV–7 is depressed, a momentary signal is passed through line 64.

While the turret slide is at the rear limit of its travel, LV–7 is depressed which produces a signal in line 64, effectively turning TA–15 OFF. After a predetermined time delay at TD–1, a signal is produced in line 66 which causes the output of TA–16 to become zero in lines 67 and 68. This condition will exist as long as LV–7 is depressed by the position of the turret slide.

The turret slide being at its rear limit of travel, the operator then depresses START button 59 which momentarily delivers fluid pressure through lines 60 and 61, as indicated by the broken lines 60 and 61 which brings the outputs of TA–9, TA–10 and TA–11 to zero position. When fluid pressure in the output 72 of TA–9 becomes zero pressure, then the inputs to TA–17 and TA–18 connected through line 72 will also be at zero pressure. As explained above, with input in line 68 to TA–17 at zero pressure and the input line 72 to TA–17 at zero pressure, a momentary signal, indicated by the broken line 73, will be delivered to TA–19 and TA–20. At the same time, the input to TA–21 will be at zero pressure, as indicated by line 74 connecting with the zero output of TA–19. Since the output of TA–20 is at zero, as indicated by line 75, there will be fluid pressure in the output line 76 of TA–21 which is delivered to TA–22. With the pressure in TA–22, its output 77 will be at zero pressure. With zero input from line 77 to TA–23, fluid pressure will be established as an output from TA–23 in line 78 to be delivered to TA–9. Thus the signal established by the fluid pressure along the route just described to TA–9 will serve to hold TA–9 OFF subject to readjustment by delivering a subsequent pressure signal thereto, as will appear hereinafter.

With pressure in line 76 leading from TA–21 to TA–22, pressure is also present in line 79 which will, in effect, hold the output 74 at zero pressure at TA–19 and TA–21. Pressure will also be delivered to TA–20 through an input from line 76 which had already been established at zero pressure at its outputs.

It follows that when the momentary signal through line 73 returns to zero pressure, the outputs at 74 and 75 will be held OFF at zero pressure by the output of TA–21. This is one of two conditions of a "flip-flop" function as performed by TA–19, TA–20 and TA–21. This "flip-flop" action will function at the end of the forward position of the turret slide at the point where it is to be shifted to RETURN, as will be pointed out later on.

Since TA–19 and TA–20 are OFF, as has just been described, in view of the "flip-flop" condition, TA–25 and TA–26 are ON by virtue of TA–19 and TA–20 being deactivated by fluid pressure delivered from TA–21. As a result of no input to TA–25 and to TA–26 because the outputs of TA–19 and TA–20 are OFF, there will be fluid pressure delivered from TA–25 through line 80 to TA–27, bringing output 81 to zero pressure. Since the outputs from TA–19 and TA–20 are at zero pressure, there will be established an output from TA–26 in line 82 to JA–9 and TV–9, JA–9 being a fluid jet amplifier which serves the purpose of bringing the fluid pressure to a predetermined value. The fluid pressure delivered from PV–9 from line 83 to a conventional four-way three-position valve V–1 is shown in a hydraulic circuit illustrated diagrammatically in FIGURE 6. The actuation of valve V–1 is to supply hydraulic fluid pressure to traverse the turret slide in either forward or reverse directions. As a result of supplying fluid pressure in line 83, the signal so imposed will cause the valve V–1 to supply fluid pressure to the turret slide to effect forward movement.

Figure 9:
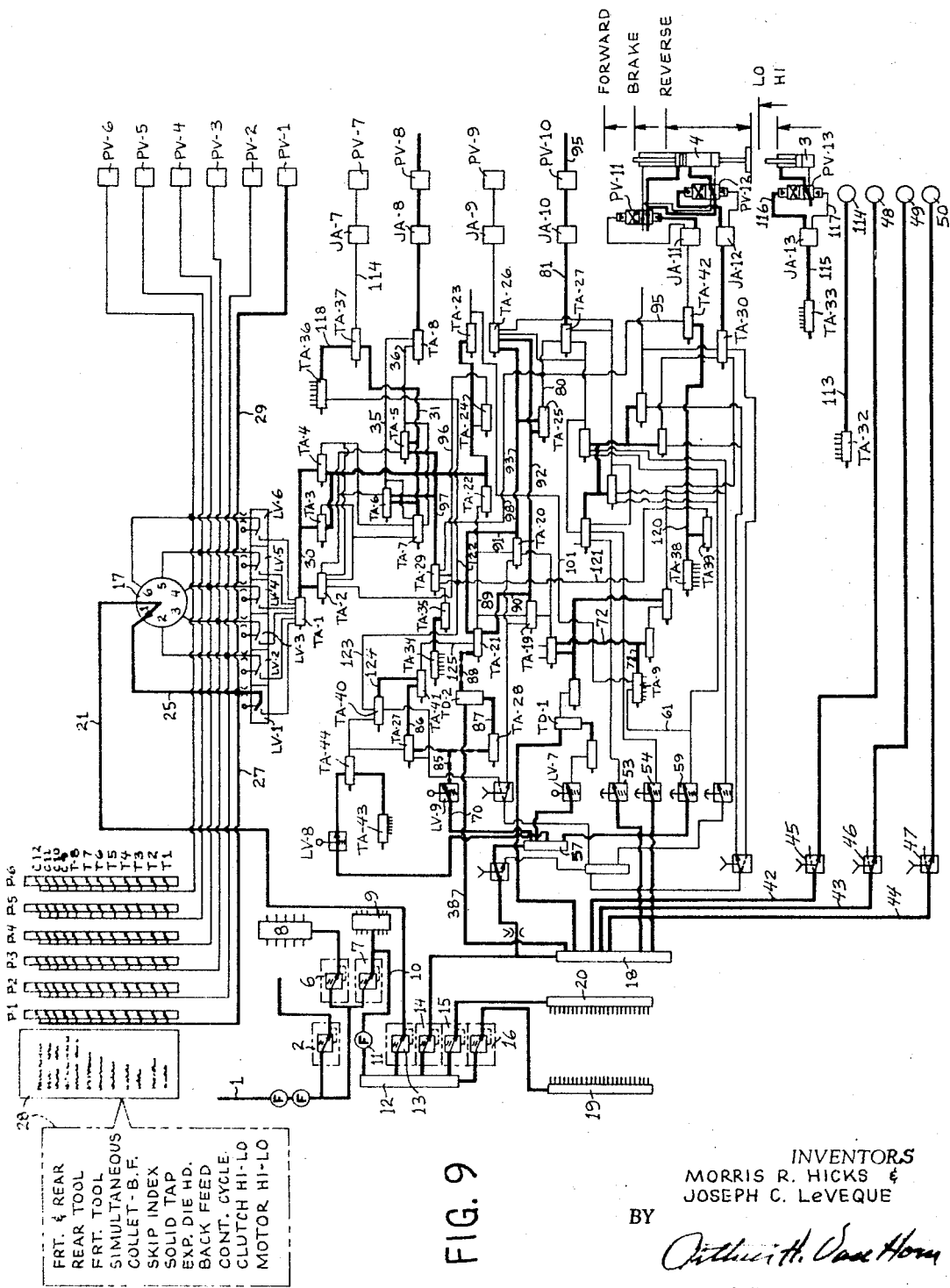

Having described those portions of the cycle through which the turret slide passes through forward rapid and feed, FIGURE 9 illustrates the fluidic-pneumatic portions of the circuit which are brought into play for the return rapid portion of the turret slide cycle.

As the turret slide reaches the end of its forward limit of motion, limit valve LV–9 is engaged by a stop 84 which is carried by the saddle of the machine and has limited movement toward and away from the limit valve LV–9. The stop is actuated by contact with the forward end of a stop screw 24 which, as shown in FIGURE 3, moves in direct alignment with the stop 84 as the turret slide approaches its forward limit of motion. As the turret slide reaches its limit of motion, the stop screw will cause the limit valve LV–9 to be depressed, instituting a momentary signal in line 85 to TA–27 and also to TA–28. As explained before, fluid pressure is supplied to limit valve LV–9 by line 70 from the manifold 57. The momentary signal to TA–27 and TA–28 turns OFF outputs 86 and 87, respectively. Fluid pressure from the manifold 18 is supplied through line 38 to time delay TD–2, and since output from TA–28 is OFF because of the momentary signal from line 85, and there is no input from line 87 to TD–2 at the expiration of the momentary signal in line 85, fluid pressure will be reestablished in line 87 and supplied to the input of TD–2.

The absence of an input from line 87 to TD–2 is only of a momentary nature because of the momentary signal in line 85. In response to the momentary absence of an input from line 87, the time delay TD–2 will respond after a selected time delay to establish fluid flow from line 38 and reestablish pressure in line 88. Up to the time of the inception of the time delay as effected by TD–2, line 88 is at zero pressure but after the termination of the time delay, fluid pressure is established in line 88 until the momentary signal in line 85 is terminated. Line 88 is an input to TA–21.

Since output 89 is at zero pressure, as contrasted to being under pressure as shown in FIGURE 7 which is in the "flip-flop" part of the circuit, as a result thereof, TA–19 and TA–20 will be effective to supply fluid pressure and will establish a feedback through line 90 to TA–21 and through line 91 to TA–21. These two feedbacks will be established even though a momentary signal in line 88 has been terminated. With the establishment of these feedbacks from TA–19 and TA–20, fluid pressure will be delivered through lines 92 and 93, respectively, to TA–26, also terminating the output of TA–25 and establishing zero pressure in line 80 and TA–27 which permits the establishment of pressure in line 94 through JA–10 and PV–10 to line 95 to reverse valve V–1. This shifts the circuit to RETURN.

Since the output of TA–21 is OFF, it will allow TA–22 to turn ON, thus turning OFF the outputs of TA–23 and TA–24. Since TA–25 output is OFF, there will be no signal in line 98 to TA–29. Since lines 96 and 98 are OFF, an output from TA–29 will be established in line 97 which delivers fluid pressure to TA–5 and TA–6, thus turning OFF the outputs of these two units as represented by lines 35 and 36. The feedbacks from lines 35 and 36 to TA–7 are also at zero pressure which establishes an output through line 31 to TA–5 and TA–6 holding the outputs in OFF position. There will be established a pressure output in line 99 to TA–8 and PV–8. The output from PV–8 will be delivered to a hydraulic valve V–2 illustrated in FIGURE 6, thus shifting the hydraulic circuitry to RAPID TRAVERSE.

Figure 10:
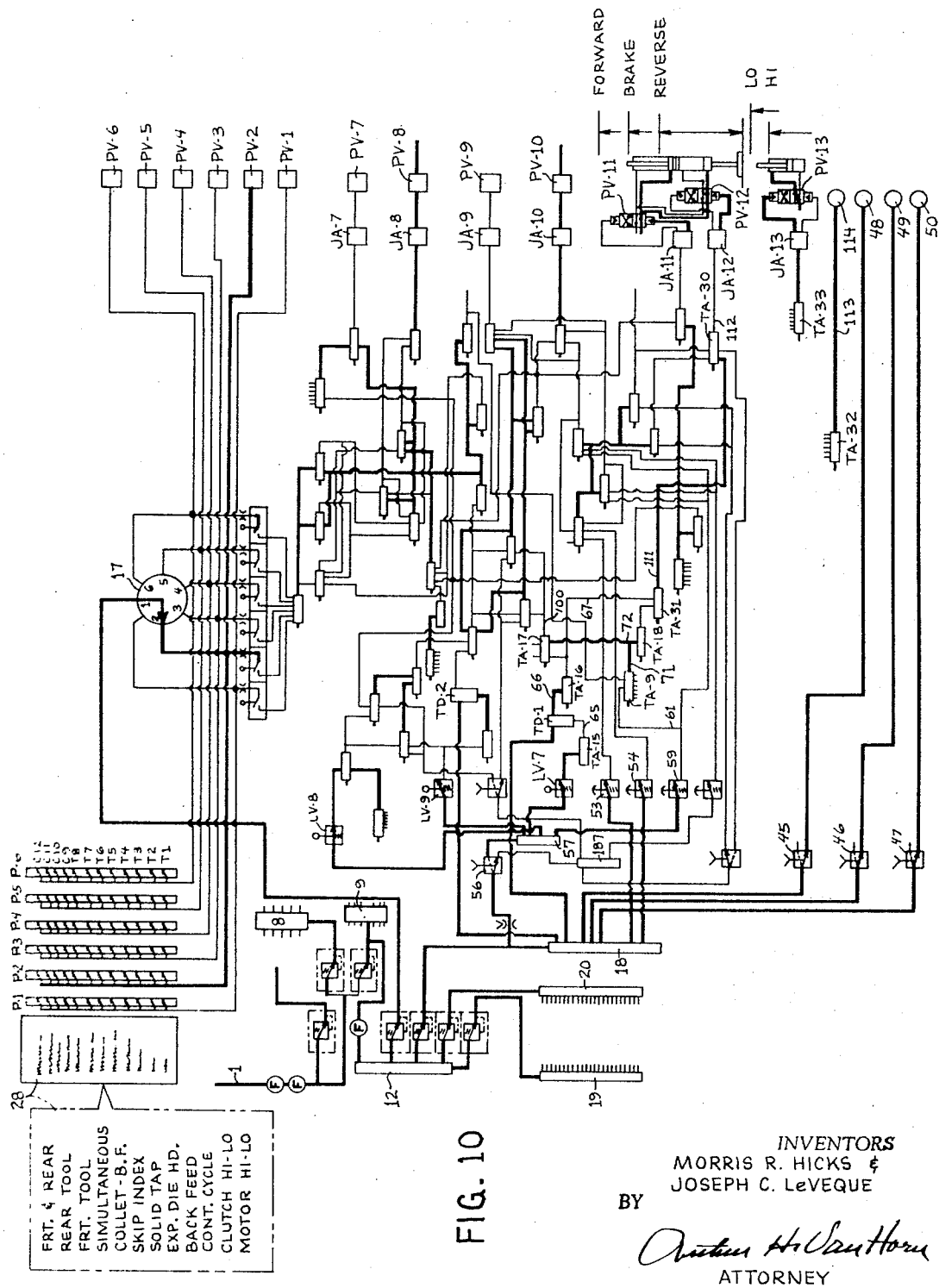

Just before the slide reaches its rearward limit of travel, the turret is mechanically indexed by conventional means (not shown) in a conventional manner. This index of the turret from face 1 to face 2 is indicated in FIGURE 10 by the position of the arrow on the turret face sector 17 which now is on face 2. As the slide reaches its rearward limit of travel, it engages limit valve LV–7 which supplies fluid pressure to TA–15 which turns OFF output 65 to TD–1. After a predetermined period of time lapse occurs in TD–1, an output is established in line 66 furnishing fluid pressure to TA–16 which turns TA–16 output to OFF. In view of the fact that output 67 is OFF, and also in view of the fact that line 72 supplies fluid pressure to TA–17, the output 100 of TA–17, the output 100 of TA–17 is OFF.

Since it has been established above that the output of TA–23 is OFF, it follows that line 101 is at zero pressure and since START button 59 is not depressed, there will be zero pressure in line 61 leading to TA–9. This condition will result in an output from TA–9 to line 72.

Having thus completed the cycle of operation of the movement of the turret slide from START through RAPID-FORWARD, FEED, RETURN RAPID and RETURN HOLD, and since the turret has been indexed from station 1 to station 2, as explained above, the cycle of operation is repeated through the indexing of selected faces 3, 4, 5 and 6 consecutively. To go through this squence, the START button is actuated for each face of the turret.

Figure 11:
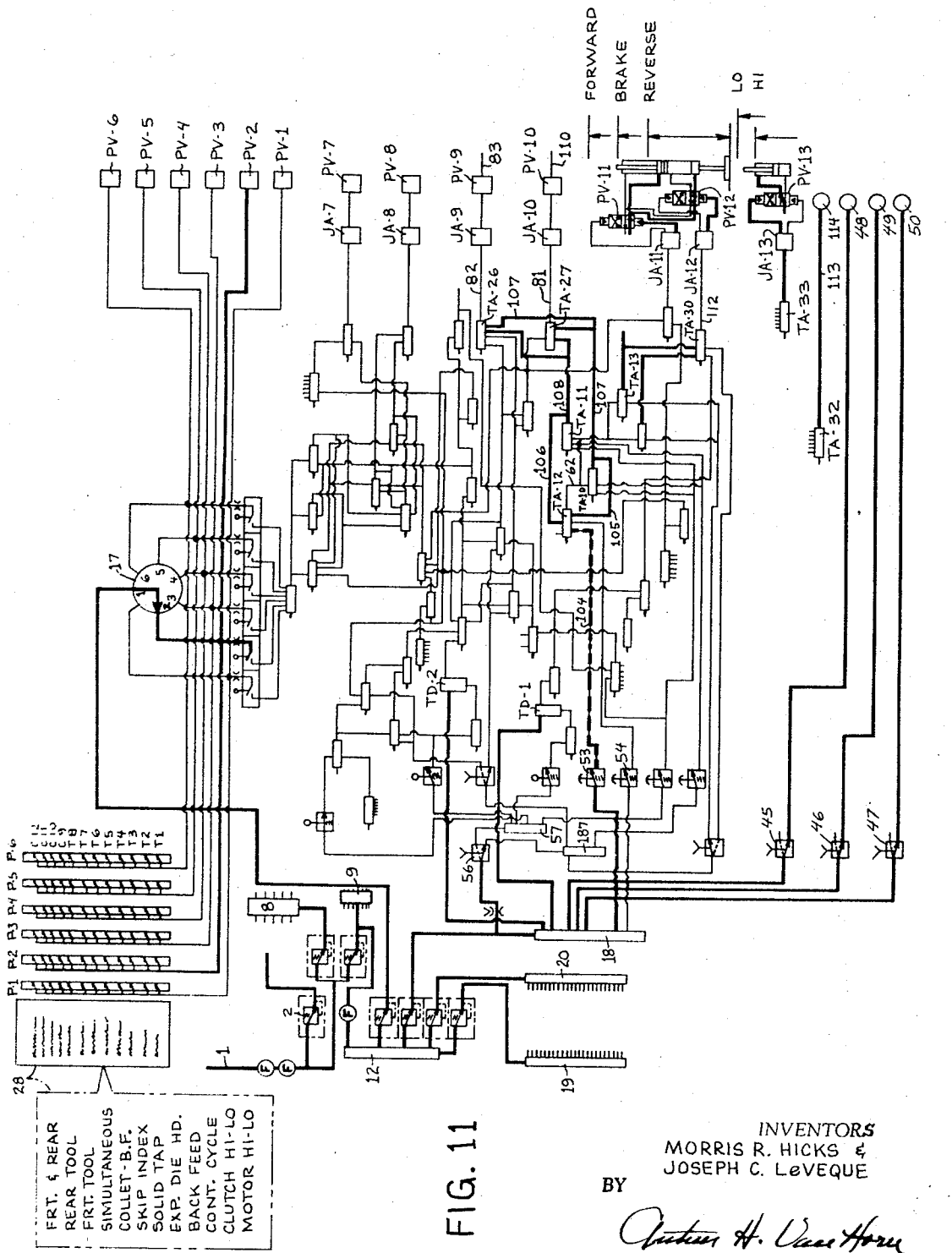

As shown in FIGURE 11 which represents a STOP condition under which no movement of the slide takes place, upon depressing the spring loaded ON and OFF valve 53, a momentary signal is transmitted through line 104 to TA–12 which renders output 62 at zero pressure. Since the output 62 of TA–12 is at zero pressure, the outputs of lines TA–10, TA–11, TA–13 and TA–14 will be ON, as indicated by the heavy lines in this figure. The outputs from TA–10 and TA–11 are fed back through lines 105 and 106, rspectively, to TA–12. The feedbacks to TA–12 assure holding TA–12 OFF after the operator has released valve 53. The outputs of TA–10 and TA–11, which are indicated at 107 and 108, respectively, both deliver fluid pressure to TA–26 and TA–27. Under these conditions, the outputs 82 of TA–26 and 81 of TA–27 are at zero pressure. Since outputs 82 and 81 are at zero pressure, valve V–1 is spring shifted to its center STOP position, as shown in FIGURE 6. Outputs from PV–9 and PV-10, as indicated at 83 and 110, respectively, are connected with the valve V-1, as shown in FIGURE 6.

It will be noted that spring loaded STOP valve 54 is provided and performs the same functions with respect to TA-10, TA-11, TA-12, TA-13 and TA-14 as does valve 53. Valve 54 is provided as an alternative stop means as an additional safety measure and these valves may be located at convenient locations on the panel within easy reach of either hand of the operator.

Returning briefly to the descriptions of FIGURES 7, 8 and 9, it will be noted that there is shown means which can be incorporated in the fluidic-pneumatic circuit for braking the spindle. It will be noted in FIGURES 7, 8 and 9 that fluid pressure output from TA-30 is transmitted to jet amplifier JA-12 which controls PV-12, releasing the spindle brake control cylinder 4. The spindle brake may be of conventional type. Forward and reverse clutches, the spindle speed clutch, and the spindle brake are of conventional form and are operated from cylinders 4 and 3, respectively, and therefore are not shown herein. As shown in FIGURE 10, which illustrates RETURN-HOLD, TA-31 will have a fluid pressure output through line 111 to TA-30 rendering output 112 to zero pressure, thus permitting the spindle brake to be applied, stopping the spindle during RETURN-HOLD. As shown in FIGURE 11, the outputs from TA-13 and TA-14 are delivered to TA-30 also establishing zero pressure in output 112. Under these conditions just described in connection with FIGURE 11, when the STOP button is depressed, the motion of the spindle will be stopped.

*Over-all selecting means for imparting selected functions to be carried out by the turret slide and/or the cross slide*

Referring generally to FIGURES 7 through 11, means for selecting various functions of the turret slide and the cross slide of the machine are shown diagrammatically, and as indicated in the upper left-hand portion of each of these figures, include a panel 28 which may be incorporated in the face of the console C and which indicates the ON-OFF valve to be actuated for each indexed face of the turret for each function available and provided for on the panel.

In these figures, it will be noted that there are vertical series of ON-OFF valves for each turret face, i.e., P-1, P-2, P-3, P-4, P-5 and P-6, and that these ON and OFF valves, in addition to being arranged in vertical order corresponding to the function to be performed, are also arranged in consecutive order in an aligned horizontal direction for each function to be selected for a selected face of the indexed turret. In FIGURE 7, the aligned horizontal series for each ON-OFF valve has been indicated and prefixed by the letters T and C, it being understood that each horizontal series will be referred to hereinafter by the same designation, the vertical series of each turret face already having been identified as P-1 through P-6.

Reading upward from the bottom of panel 28, the turret slide functions may be identified as follows:

T-1—Motor HI-LO
T-2—Clutch HI-LO
T-3—Continuous cycle
T-4—Backfeed
T-5—Expandable die head
T-6—Solid tap
T-7—Skip index
T-8—Collet Reading upwardly from T-8, the four functions there shown may be referred to as cross slide functions, C-9, simultaneous; C-10, front tool; C-11, rear tool; and C-12, front and rear tool.

From this diagrammatic showing on these figures, it will be understood by way of example that any one or more of these functions may be selected for any preselected working face of the turret and that the selections of functions are not limited to the cross slide or to the turret slide, but may be employed either in combined or in independent performance.

Although it is indicated in FIGURES 7 through 11 that the panel 28 shows certain selected functions to be performed by the turret slide and/or cross slide for any and all faces of the turret, the invention is not to be construed as limiting the functions to those listed, since others could be either embodied or deleted, if desired.

More specifically, in carrying out the function selected, it is pointed out that the output from the ON-OFF valve P-1, which corresponds to the function known as "Motor HI-LO," is directed to one of the signal inputs to TA-32 which, when the signal is delivered to TA-32, line 113 will drop to zero pressure, and its pressure switch 114 will be deenergized, thus shifting the spindle motor SM from low to high speed. As shown by the heavy line, line 113 is shown as supplying fluid pressure to the pressure switch 114 which, under these conditions, the spindle motor SM would be running in low speed but, as explained above, as soon as the pressure in line 113 drops to zero, as a result of the signal to TA-32, the pressure switch will respond to shift the motor to high speed.

Thus it will be seen that the motor speed at any indexed turret face can be selected at high or low speed.

T-2 controls a clutch for HI-LO spindle speed and its signal output is delivered to TA-33 through one of the series of signal inputs as indicated in the drawing. It will be noted that the output of line 115, as shown in FIGURE 9, indicates output pressure to JA-13 but upon delivery of a signal from T-2 to TA-33, all output of line 115 will return to zero. With an output from TA-33, JA-13 is shifted to energize line 116 to shift PV-13 to the position shown which shifts clutch to HI, as shown. A signal from T-2 brings line 113 to zero pressure causing JA-13 to shift so that line 117 is energized and PV-13 is shifted to the opposite position to shift clutch to LO speed.

Function T-3 for continuous cycle may be employed in a selected manner for any one or more combinations of faces of the turret by turning on selected valves in the horizontal series T-3 for the selected turret face or faces which are to be included in the continuous cycle. Under these conditions, a signal will be delivered in each instance to an input to TA-9, thus bringing the output of TA-9 to zero pressure in line 72. By referring to the description heretofore made in connection with pertinent parts of FIGURE 7, it will be observed that with zero pressure in line 72, the turret slide will begin its rapid forward motion upon receiving a signal from limit valve LV-7 through TA-15 overriding LV-7 which establishes a momentary signal in line 64 to TA-15, thus bringing about a situation described in connection with FIGURE 7 heretofore, thus eliminating the RETURN HOLD condition as shown in FIGURE 10, allowing the slide to proceed through its continuous cycle as determined by the open valves T-3.

The backfeed function is indicated by T-4 of the horizontal series and when any appropriate valve in this series is opened, a signal will be delivered to TA-34 through one of the inputs shown therein, rendering the output of TA-34 at zero pressure and thus precluding a signal to TA-35. With zero pressure in the output of TA-34, the output of TA-35 will be turned ON to hold TA-29 OFF, turning TA-35 ON and TA-29 to HOLD. Since an output in TA-29 is required to shift to RAPID TRAVERSE at the beginning of the return stroke of the turret slide, as shown and described in connection with FIGURE 9, it will now be clear that the turret slide will remain in FEED so that at the beginning of the return traverse, the turret slide will be in FEED. The slide will feed back until it overrides the corresponding feed rapid limit valve which is appropriate for its presently selected face. As shown in FIGURE 9, this limit valve would be LV-1 since the turret is in the No. 1 position.

When the turret slide feeds back to the START feed position, it will depress limit valve LV-1 and a signal will be delivered to TA-1 which in turn will bring the output of TA-1 in line 30 to zero pressure. TA-3 and TA-4 cannot turn ON since the output of TA-22 is ON in return. Since TA-3 and TA-4 are OFF, TA-2 will turn ON and the output of TA-2 will be delivered to TA-5 and TA-6, turning TA-5 and TA-6 OFF to establish the condition for rapid traverse and as shown and described in connection with FIGURE 9.

Reading up further on the panel 28 to the next function which is "Expandable Die Head" indicated at T-5, a signal from any one or more of the six vertical columns in this horizontal series will deliver a signal to TA-36 through one of the inputs indicated thereon which establishes zero pressure in output line 118.

As shown in FIGURE 8, with zero pressure in lines 118 and 31, TA-37 will deliver fluid pressure through line 119 to JA-7 and to PV-7. Of course, this situation will exit only during the feed portion of the turret slide cycle.

The output of PV-7 then is delivered to valve V-3 shown in the hydraulic circuit illustrated in FIGURE 6. The pressure of the fluid passing into V-3 is bled off through an adjustable orifice indicated at O-7. This orifice is adjusted by the operator to regulate the whole pressure of the turret slide hydraulic circuit during the feed portion of the slide travel.

The adjusted bleeding off of the hydraulic fluid pressure at V-3 creates a "float" feed condition in the turret slide which at first contact with the workpiece during feed of the slide meets some resistance to further feeding motion during the initial thread cutting with sufficient but limited force established in the cutter to allow the tool to advance into the workpiece a short distance until the cutting die advances beyond the initial thread cutting depth to a point where the rotating workpiece will assume a relationship with the tool to such an extent that further forward feed of the tool and the workpiece will be of an increasing floating nature requiring less hydraulic pressure to advance the turret slide during the final stages of the depth of the cut.

The "Solid Tap" function indicated at T-6 requires a signal from any one or more selected turret face positions reading horizontally across the vertical columns V-1 through V-6 in FIGURES 7 through 11. When one or more of the ON-OFF valves in this horizontal series is open, a signal or signals will be dispatched to TA-38 through one of the signal inputs therein causing a zero output to be established in line 120 and establishing fluid pressure flow through TA-39. The output of TA-39 establishes fluid pressure in line 121 which is delivered to TA-29 to establish the backfeed function as just explained above.

Fluid pressure from TA-39 is also established to line 122 to TA-36 to establish low pressure function as just described above.

The output of TA-39 can also be traced through line 123 to TA-40, thus bringing the output TA-40, line 124, to zero pressure so that an output will be produced from TA-41 through line 125 while the turret slide is overriding LV-9 to depress the same. The output 125 which is delivered to TA-21 shifts the circuit to RETURN as described above in connection with FIGURE 9. By this means, the time delay or dwell is effectively bypassed. Since line 120, the output of TA-38, is at zero pressure, as just described, and since line 98 leading to TA-42 is also at zero pressure, an output of TA-42 to JA-11 is established to actuate PV-11 thereby shifting the rotation of the spindle to REVERSE. This occurs only during the return part of the slide movement.

The function of "Skip Index" as noted on panel 28 is indicated at T-7 and when a signal is delivered by closing any one or more of the horizontally arranged ON-OFF valves in T-7, a signal is delivered to TA-43 through the inputs shown thereon. Under such conditions, whichever turret face is selected for skip index and is indexed to position, TA-43 will be OFF. With TA-43 OFF, an output from TA-44 is available when the slide is in position to depress valve LV-8. This limit valve is located just forward of the extreme rear limit of travel of the turret slide and sufficiently so as to permit the mechanical indexing mechanism to be reset to effect an index as the turret slide returns. The output from TA-44 will be delivered to TA-40 and to TA-27, thereby causing zero pressure in the outputs TA-40 and TA-27. With TA-27 and TA-40 at zero fluid pressure, an output is established from TA-41 to TA-21. This will shift the circuit to turret slide return. Under these conditions, the turret slide will go forward far enough to reset the indexing means and go into RETURN and then bring the next selected face into operating position.

Function T-8 is that of the bar feed COLLET. In this connection, reference is made to FIGURE 13 of the drawings from which it will be observed that when an input signal is delivered to TA-45, the output from TA-45 is at zero in line 126 leading to an input to TA-47. With the cross slide CS in PARK position, indicated by cam K-12 in FIGURES 12 and 13, line 127 in FIGURE 12 will be at zero. With lines 126 and 127 being at zero pressure, and when the output of TA-46 is at zero pressure due to an input from TA-23 which occurs throughout the FORWARD turret movement of the turret slide (as shown in FIGURES 7 and 8), the output of TA-46 will be at zero pressure. Under these conditions, the output of TA-47 will be delivered to JA-14 and through line 128 to one side of PV-14. When the turret slide shifts to RETURN movement, as shown in FIGURE 9, the output from TA-23 to TA-46 is at zero pressure and TA-46 turns on to deliver fluid pressure through line 130 to TA-47. When the output of TA-47 is at zero pressure, the output of JA-14 will be shifted to line 128 which will cause PV-14 to shift to COLLET CLOSED POSITION, thus providing conventional means for carrying out function T-8 for actuating the collet to or from open or closed position under conditions to be described more fully hereinafter. This is illustrated by corresponding heavy lines in the appropriate portion of FIGURE 12. As long as line 127 is supplied with fluid pressure, the collet cannot open.

It will be evident that when the collet is open, there will be a signal delivered from LV-11 through line 131, the purpose of which will be described hereinafter. However, when the collet is closed, line 131 will be at zero pressure.

*Cross slide and collet operation through selected functions*

Hereinbefore the operation of the turret slide cycle has been described through its forward traverse, feed and rapid return movements, as well as in conjunction with selected functions which are superimposed upon the normal cycle of the turret slide.

FIGURES 12 through 15 will be referred to and described in detail in which the cross slide and collet functions to be performed are interrelated to the turret slide and function circuitry heretofore described.

While the pneumatic circuitry for operating the collet to open or closed position is illustrated in FIGURES 12 through 15, it is to be understood that the collet is primarily responsive to the turret slide as it passes through its selected cycle of operation.

As disclosed herein, the cross slide may function to provide forward traverse and feed and rapid return to a front tool and holder on the slide and/or to a rear tool and holder through the same motions of cycle as provided for the front tool and holder. Such functions may be selectively carried out by means of cams K-12, K-13 and K-14 adjustably carried on a cover plate mounted on and movable with the cross slide as shown in FIGURE 3. PARK position of the slide is determined by cam K-12 actuating LV-12. Front tool FEED position of the slide is determined by cam K-13 actuating LV-13 and rear tool feed position is determined by cam K-14 actuating LV-14. It is clear that while the disclosure herein shows both a front and rear tool and holder slide, that either one may be dispensed with as desired, and the operation of the slide may be confined to the remaining tool and holder mounted thereon.

Figure 12:
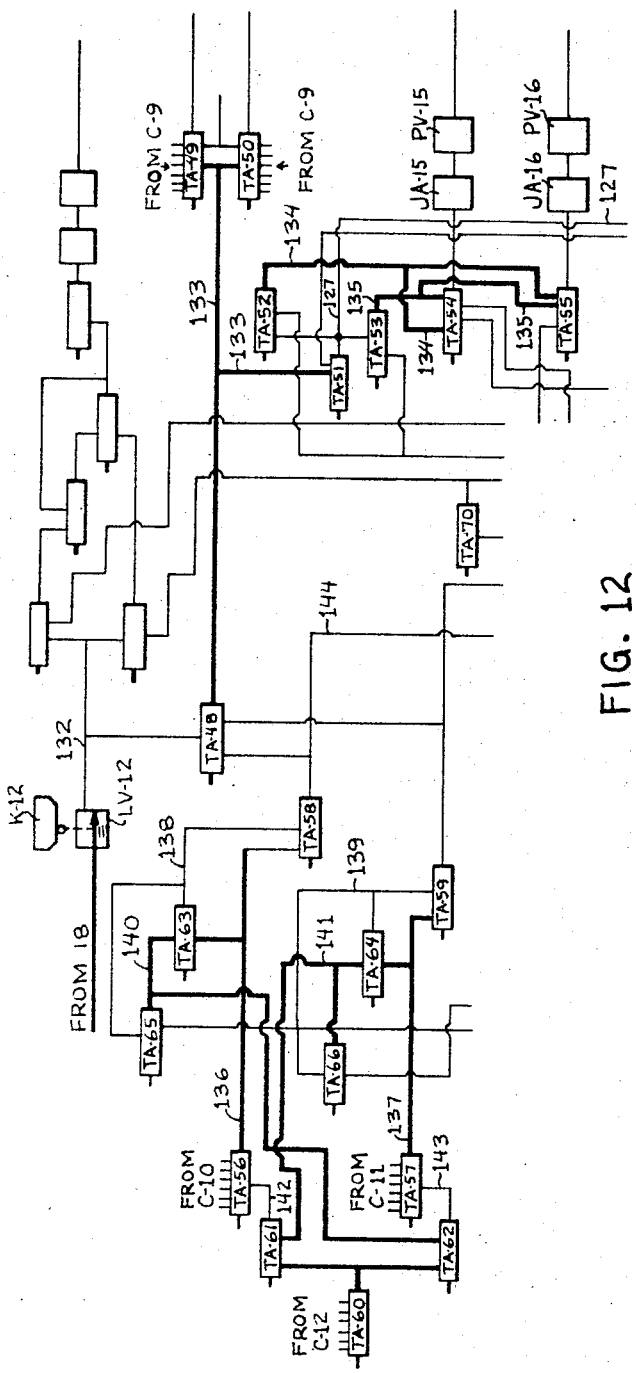

Referring first to FIGURE 12 which is a partial diagrammatic showing of the cross slide circuitry showing the cross slide in PARK position to depress park limit valve LV–12, constant pneumatic pressure is furnished from manifold 18 to the limit valve but since the valve is closed, line 132 will be at zero pressure leading to TA–48. Since TA–48 is under no input pressure, a signal will be delivered through line 133 to TA–49 and to TA–50. The functions of TA–49 and TA–50 will be described hereinafter. Line 133 is also an input to TA–51. Since there is no output from TA–51, TA–52 and TA–53 will deliver a signal through line 134 and 135, respectively, to TA–54 and TA–55, respectively, thus bringing the outputs of TA–54 and TA–55 to zero pressure. With zero pressure in outputs from TA–54 and TA–55, JA–15, JA–16 and PV–15 and PV–16 will be OFF allowing V–7 to shift to OFF position. Thus it will be seen in FIGURE 5 that the cross slide hydraulic circuit is so arranged that the cross slide remains in the position shown at CS in this figure in full lines, that is, it will continue to depress limit valve LV–12 and remain in that position.

Referring to the left hand portion of FIGURE 12, it will be observed that since all inputs to TA–56 are at zero, which may be identified as the front tool input function control C–10 and also since TA–57, which is the rear tool function control unit, is also devoid of inputs are shown, there will be an output signal in lines 136 and 137 to TA–58 and TA–59, respectively. TA–60 is a control unit for both front and rea tools and since there is no signal input to TA–60, its output signal will be delivered to TA–61 and TA–62, respectively, which holds the outputs of TA–61 and TA–62 to zero pressure. The outputs 136 and 137 of TA–56 and TA–57, respectively, also supply an input signal to TA–63 and TA–64, respectively, thereby providing zero pressure in their respectively outputs 138 and 139. Since 138 and 139 are at zero pressure, TA–65 and TA–66 will produce output pressures in line 140 and 141, respectively, producing a zero pressure in outputs 142 and 143 of TA–61 and TA–62, respectively.

Figure 13:
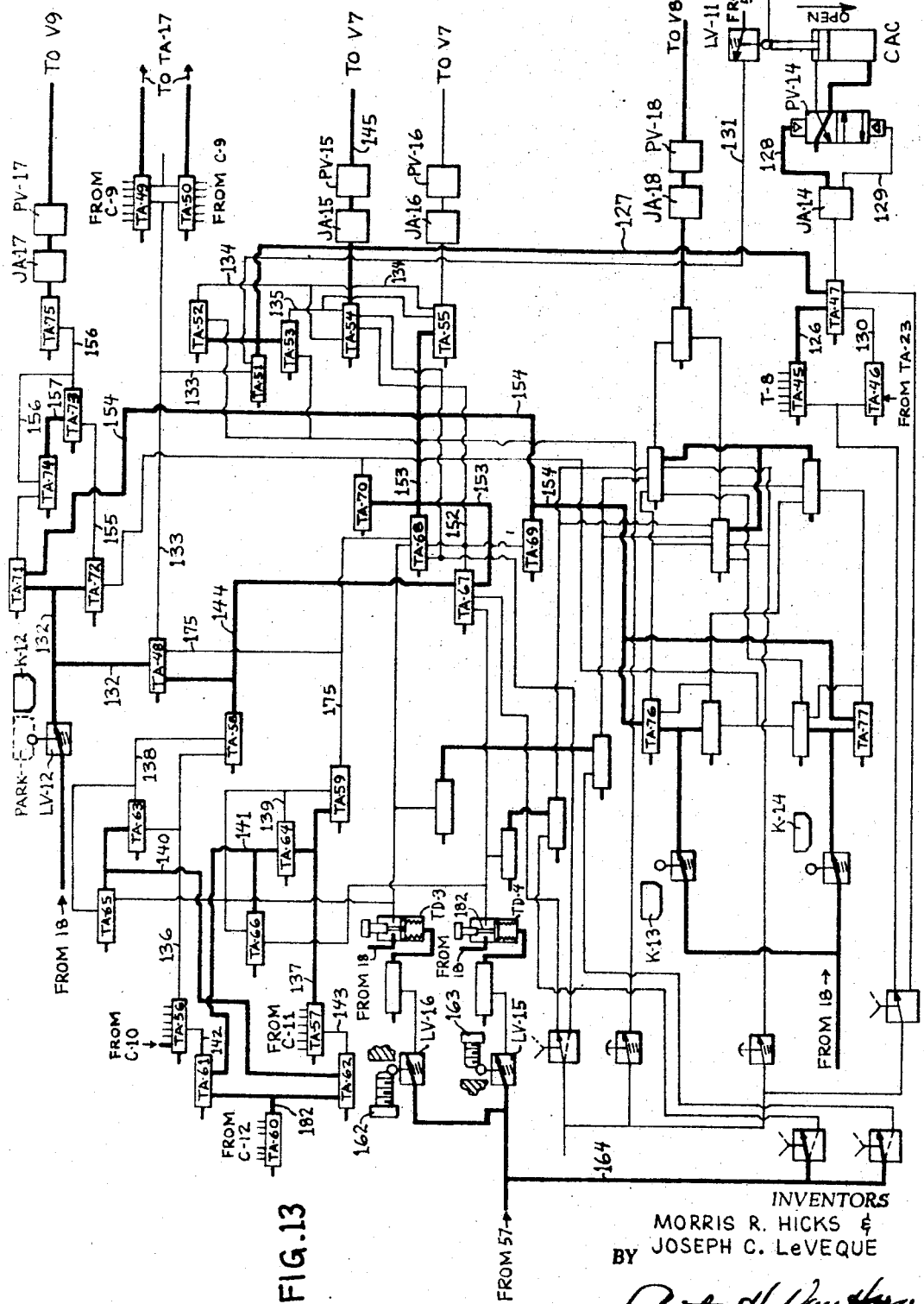
Figure 14:
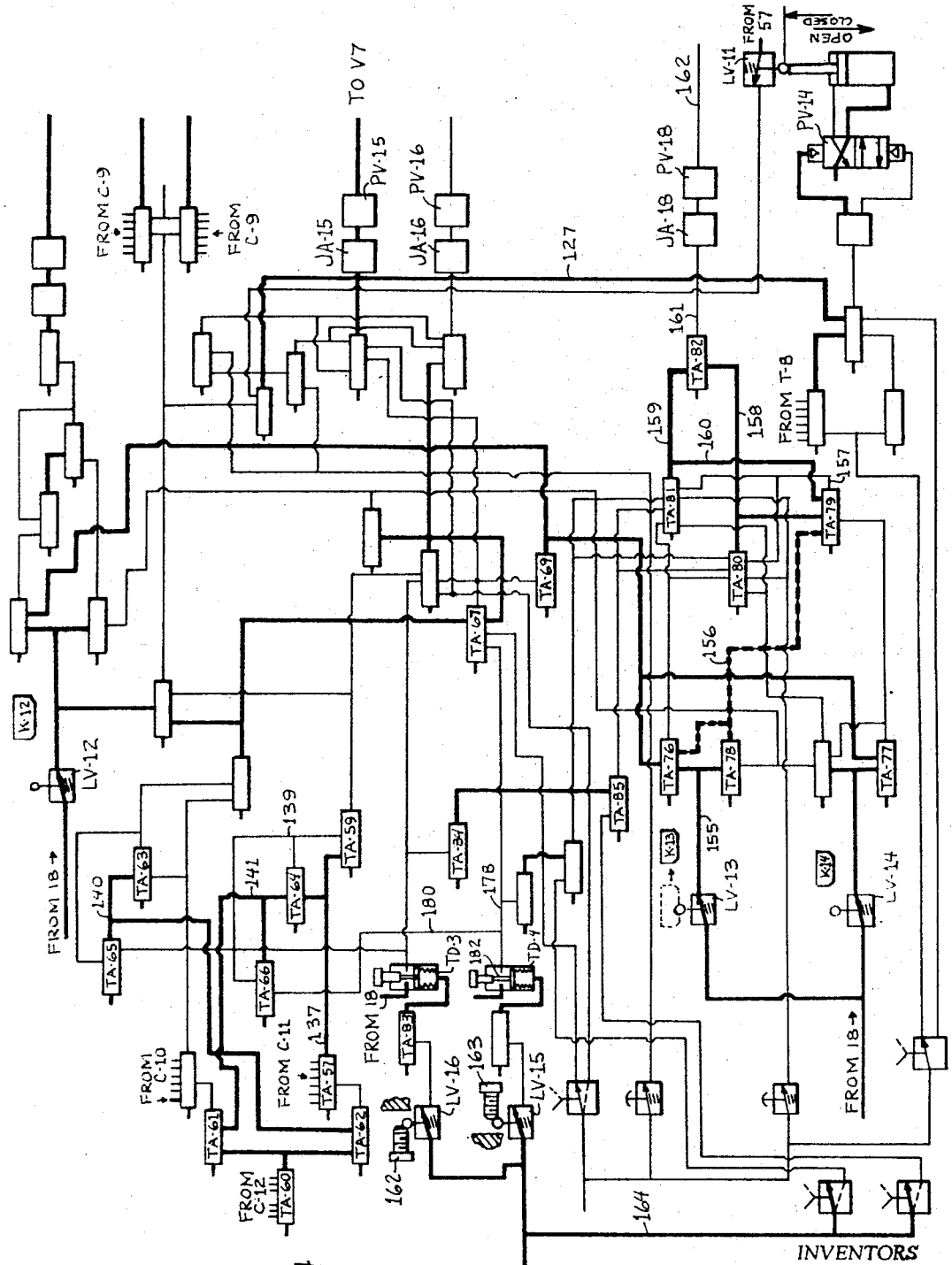
Figure 15:
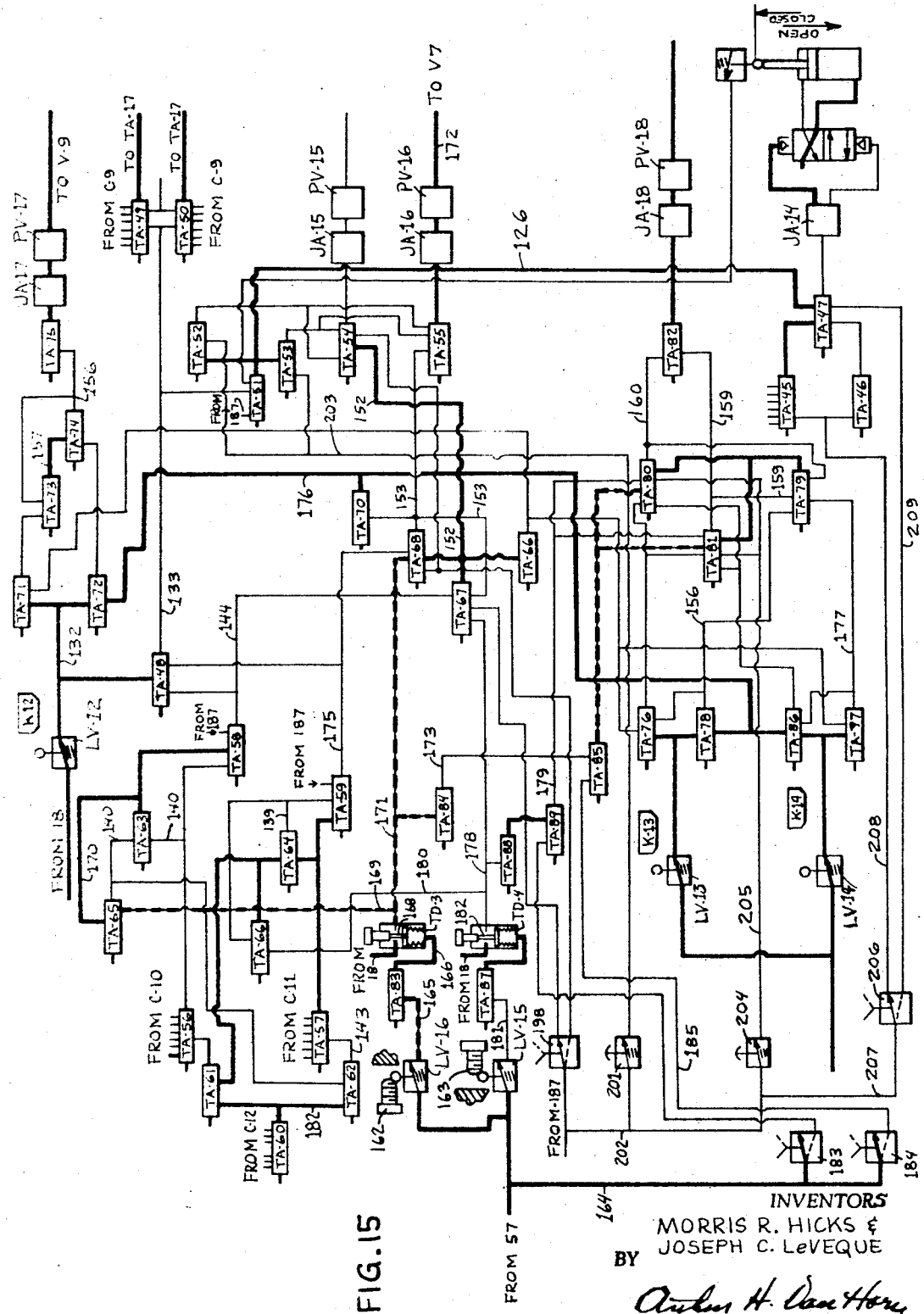

The immediately following description will refer to the cross slide logic circuitry particularly shown in FIGURES 13, 14 and 15 as representing the cycle of movement of the cross slide front tool, namely, rapid approach, feed and rapid return. A similar cycle of the rear tool may be accomplished by a slight modification which will be described more fully hereinafter.

Referring now to FIGURE 13, in particular, with respect to front tool TRAVERSE-IN, this function is accomplished by delivering a signal from C–10 as indicated on FIGURE 7 on the function panel 28, to TA–56 which causes the output of TA–56 to be at zero pressure as in line 136 and since line 138 is also at zero pressure from the output of TA–63, TA–58 will deliver an output through line 144 as an input to TA–67. Line 144 will also deliver an input to TA–48. Under these conditions, line 133 will be at zero pressure at TA–49 and TA–50, thus setting up a condition for delivery of fluid pressure from these two units which will be described hereinafter. Since line 133 is at zero pressure, TA–51 will deliver fluid pressure through line 127 to TA–47.

The inputs to TA–52 and TA–53 from line 127 will cause zero pressure in lines 134 and 135, respectively, so that TA–54 will deliver fluid pressure to JA–15 and PV–15 to start the cross slide to TRAVERSE-IN in one direction through JA–15 and PV–15 at line 145 leading to V–7. Delivery of fluid pressure through line 145 to V–7 will shift this valve as in FIGURE 6 to the left which will permit fluid pressure from P–2 to be delivered through line 146 and with the valve shifted, through line 147 to input on one side of the piston operating in cross slide cylinder CSC to thereby shift the piston to the right, allowing discharge of the hydraulic pressure on opposite sides of V–7 to escape through line 149 and thence through the port 151 as indicated by the arrow 150 whereby the discharged hydraulic fluid will be delivered to line 151.

Referring back to FIGURE 13, when line 144 is under fluid pressure, it will deliver an input to TA–67 bringing the output pressure of TA–67 to zero at line 152. Line 152 connects with TA–68, TA–69 and TA–54. Since line 152 is at zero pressure, TA–68 will deliver an output pressure through line 153 to TA–55, TA–67 and TA–70 which will hold output of line 152 at zero pressure. The output 152 will be held at zero even though the fluid pressure in line 144 is removed as the following description will show.

Fluid pressure will be delivered from TA–69 partly through line 154 to TA–71. In this figure, as shown in dotted lines when cross slide CS is on the PARK position, by depressing LV–12, the inputs through 132 to TA–71 and TA–72 are removed, thus permitting TA–72 to deliver fluid pressure and its output to TA–73 through line 155. Line 156 leads to TA–74 and TA–75 and since it is at zero pressure under the conditions shown in FIGURE 13, TA–74 will turn ON and deliver fluid pressure to TA–73 to hold its output at zero and TA–75 will deliver pressure to JA–17 and to PV–17, thus shifting valve V–9 (FIGURE 6) to the proper position for front tool feed.

The output from TA–69 also leads through a line 154 to TA–76 and to TA–77 to insure zero pressure in the output lines during this part of the cross slide cycle, which will be discussed next in connection with FIGURE 14.

FIGURE 14 illustrates in diagrammatic form that portion of the circuitry for the operation of the cross slide which, in particular, refers to the FEED-IN of the slide or front tool engagement of the workpiece. This is indicated on the panel 28 as one of the functions of the cross slide at C–10. In the lower portion of the figure, the cross slide is shown in position to depress limit valve LV–13 as it passes from the end of the front tool RAPID-IN stroke to translate the forward stroke from this point to feed. In this figure, the slide is shown in broken lines in position for its cam K–13 to depress limit valve LV–13 at the beginning of forward tool feed movement of the slide. To the right of the dotted line position of CS is shown its position in solid lines at the end of its feed-in stroke and preparatory to RAPID RETURN which will be described in FIGURE 15. As the cross slide passes over limit valve LV–13, it momentarily cuts off fluid pressure at LV–13 output and again restores such fluid pressure in the outlet which is indicated at line 155 as soon as the cross slide has completed its pass to the right from dotted line position to allow limit valve LV–13 to open. When LV–13 is open after the slide passes along its FEED-IN stroke, fluid pressure is supplied to TA–76 and TA–78. Since line 155 is momentarily OFF as the slide passes along valve LV–13, TA–78 will pass a momentary signal along line 156 to TA–79 producing zero pressure in line 157. Line 157 is connected with TA–80 and TA–81 and as soon as 157 is brought to zero pressure, TA–81 then delivers an output signal to TA–79 through line 160 and to TA–82 through line 159. At the same time TA–80 delivers an output signal to TA–79 and TA–82 through line 158. The outputs of TA–80 and TA–81 will deliver a signal to TA–79 through lines 158 and 160 to hold TA–79 OFF after the momentary signal through 156 is OFF, thus establishing one condition of the "flip-flop." Under these conditions just described, the outputs of TA–80 and TA–81 will operate to bring the output of line 161 from TA–82 to zero pressure, thus deenergizing JA–18 and JV–18. As the output of PV–18 is at zero pressure, V–8 assumes the position shown in FIGURE 6. With V–8 in the position shown in this figure, fluid pressure will be routed to V–9. Since V–9 is supplied with fluid pressure from PV–17, as described above, fluid pressure output from V–9 will pass through orifice O–8 to regulate the feed of the cross slide depending upon the orifice adjustment of O–8. Discharge of fluid pressure from orifice O–8 will be returned to the tank. When fluid pressure from PV–17 is at zero value, V–9 will be shifted to a position which will route fluid pressure through orifice O–9 which can be adjusted to select the desired feed rate of the cross slide for the rear tool. In this connection, this will be referred to later.

Referring now more particularly to FIGURE 15, this diagrammatic showing of the circuitry represents the conditions when the cross slide is in RAPID-OUT. Signal fluid pressure is supplied from manifold 57 through line 164 to limit valves LV–15 and LV–16. When the front tool stop screw 162 momentarily engages LV–16 in its travel to the right in FIGURE 14, this valve is closed and delivers fluid pressure through line 165 to TA–83 so long as LV–16 is depressed. This period is of short duration as indicated by broken line 165, due to the fact that the head of the front tool stop screw is in engagement with the valve stem only at the end of its stroke. The flow of fluid pressure in line 165 is of short duration but is sufficient to supply an input to TA–83 which, of course, will cause zero pressure in output 166 leading to TD–3 (FIGURE 15), and since there is no fluid pressure within the bellows of TD–3 at this point, the stem 168 will be withdrawn from its upper position and allow a fluid pressure signal to be transmitted from 167 through line 169 to TA–65, causing zero pressure in line 140 to the output TA–65. Under these conditions, the output to TA–63 will be delivered through line 138 to TA–58 through line 170 to TA–65, thus rendering input at 170 to hold TA–65 with no output. With a signal supplied to TA–58 through line 138, the output of TA–58 will be at zero pressure. As long as the stem 168 of TD–3 remains out of the path of lines 167 and 169, a momentary signal is thus created in line 171 leading to TA–68.

Zero pressure in output 153, as explained before, is connected as inputs to TA–70 and TA–67 and TA–55 but, since 153 is at zero pressure, TA–67 will provide an output signal through line 152 which will be distributed as inputs to TA–68, TA–69 and TA–54. Under these conditions, TA–68, TA–69 and TA–54 will be held OFF, that is, will deliver no output signal whether or not there is a signal present in line 171.

With TA–68 OFF, TA–55 will have an output signal pressure which will be delivered through JA–16 and PV–16 to the opposite end of valve V–7, as indicated in FIGURE 6 through line 172 to the opposite end of valve V–7, as shown in FIGURE 6. As a result of the shifting of valve V–7, CSC will be shifted to return the front tool to its original OUT or PARK position. The presence of a signal in line 171 will also deliver an input signal to TA–84, resulting in zero pressure output in line 173 to produce an output signal from TA–85 to TA–80 and TA–81. With a signal input from TA–85 to TA–80 and TA–81, these units will be held at zero signal output. As previously described, with the outputs of TA–80 and TA–81 ON, TA–79 is OFF. However, with the outputs of TA–80 and TA–81 OFF, TA–79 will deliver an output signal to TA–80 and TA–81 to hold these units OFF when the signal from TA–85 is removed. Since at this point, TA–80 and TA–81 are OFF, TA–82 will deliver an output signal to JA–18 and PV–18, as shown in FIGURE 6. This will shift valve V–8 to its opposite position as shown in FIGURE 6 to deliver hydraulic discharge from the cross slide cylinder through line 148 to valve V–7 and line 151 to line 174 and thence to the return tank.

After return traverse which has now been initiated, the cross slide will assume the position shown in FIGURE 11, that is, it will be on PARK position with respect to LV–12.

The output of TA–58 was turned OFF at the beginning of the OUT stroke as shown in FIGURE 15 to prevent the cross slide from repeating the cycle. It will be noted that all outputs from function selectors on panel 28 are OFF while the turret is indexing. During this period an output will be present from TA–56 to turn 63 OFF and allow 65 to turn ON and hold 63 OFF so that on any succeeding face, an output can again be obtained from TA–58 to initiate front tool cycle by a signal from C–10.

The RAPID-IN FEED and RAPID TRAVERSE-OUT for the front tool on the cross slide have been described in FIGURES 13, 14 and 15, respectively, and the same movements of the rear tool on the cross slide are substantially the same as those for the forward tool and for the purposes of reference to these figures in connection with the rear tool, the general fluidic-pneumatic circuitry may be that referred to in FIGURE 13 with the exception that the RAPID-IN movement is defined in respect to such movement of the rear tool and is initiated by a signal from TA–57 through input C–11 to TA–57 and will bring the output to TA–57 to zero pressure, allowing TA–59 to establish an output in line 175, turning OFF TA–68. Line 175 will also deliver fluid pressure to TA–48 bringing the output of TA–48 to zero pressure as in line 133.

An input signal to TA–68 results in shifting a "flip-flop" circuit as has already been described. The reversal of the "flip-flop" circuitry, as shown in FIGURE 15, serves to move the forward tool OUT, thereby causing the slide to bring the rear tool IN. Since the traversing of the forward tool OUT is the same as establishing the RAPID-IN condition for the rear tool by this one movement of the cross slide, the conditions set up by an output from TA–70 would be the same as shown in FIGURE 15, i.e., line 176 will be pressurized to shut OFF TA–72, and since the cam K–12 of the cross slide will be positioned in PARK position on LV–12, this valve will be open and line 132 will be at zero pressure. Under these conditions, TA–71 will deliver a pressure output to TA–73 which results in zero pressure in TA–73 through line 157 which allows TA–74 to turn ON. As explained before, TA–73 and TA–74 constitute a "flip-flop" circuit in this area, and when actuated by a signal, output will occur in line 156 to TA–75, establishing zero output to TA–75 through JA–17 and PV–17 which shuts OFF pneumatic pressure to V–9, thereby allowing the spring loaded valve to return to its opposite position as shown in FIGURE 6 to route the discharge through V–9.

With respect to the FEED-IN movement of the rear tool toward the workpiece, reference now is made to FIGURE 15. This figure as explained before shows the condition of the circuitry when the front tool is traversed OUT. This same motion is the equivalent of a TRAVERSE-IN movement of the slide to bring the rear tool toward the workpiece. It will therefore be clear from FIGURE 15 that when the rear tool RAPID TRAVERSES toward the workpiece, cam K–14 will move to the left in FIGURE 15 to depress LV–14, opening this limit valve and thus allowing the output of TA–77 in line 177 to shut OFF TA–79.

As has been described hereinbefore, this input signal to TA–79 will shift the circuit to move the cross slide so that the rear tool will slow down to a feed rate in the direction of the workpiece.

Again referring to FIGURE 15, traversing OUT away from the workpiece will occur when limit valve LV–15 is depressed by cam 163 which causes LV–15 to supply fluid pressure to TA–187, thus shutting 187 OFF. With 187 OFF, there will be a suitable pressure decrease in TD–4 as the plunger of the bellows passes out of the direction of flow of fluid pressure from manifold 18 to the output of TD–4. As fluid pressure is established from manifold 18 to line 178, TA–67 will be shut OFF as explained hereinbefore in connection with FIGURE 13. This condition then shifts the circuit so as to change the direction of the cross slide.

With fluid pressure in line 178, TA–88 will have zero output pressure while TA–89 will be allowed to establish an output in line 179 which leads to TA–80 and TA–81, as previously described in connection with this figure, and which allows the slide to proceed in rapid traverse away from the workpiece.

With fluid pressure in line 178, fluid pressure will be delivered through 180 to TA–66 which, together with TA–64, will provide a "flip-flop" means and as a result thereof, line 141 is at zero pressure which allows the output 139 of TA–64 to be pressurized to deliver pressure to TA–59, thereby shutting it OFF and at the same time delivering fluid pressure to TA–66, thus shutting this unit OFF also. With an output from 139 to TA–59, the output of TA–59 will be brought to zero pressure.

When cam 163 backs off limit valve LV–15, the output of LV–15 remains OFF which will deliver pressure from TA–87 to TD–4, expanding the bellows therein and interposing the stem 182 to TD–4 in the path of the fluid flow from 18 to 178. This again establishes the maintained reversed motion of the "flip-flop" just described above.

As cam K–12 moves to PARK position to depress limit valve LV–12 to open its output to line 132 and since line 175 is at zero pressure to TA–48, the output 133 to TA–48 will create an output to 133 and at this point the slide will come to rest to complete the cycle.

Another one of the cross slide functions as shown on panel 28 is the front and rear tool functions identified as C–12. By means of this function, the front and rear tools may be programmed in sequence in either direction at any or all faces of the turret to be initiated or carried out during a position of any one or for any selected face or faces of the turret when in position to face the workpiece. The sequence of initiating one or the other tool elements for any selected turret face is carried out by programming the desired selection through either C–10 or C–11 by supplying an input signal to one or the other of these units.

In carrying out this function, an input to TA–60 is supplied through C–12 which also results in zero output pressure in line 182 which is connecetd to TA–61 and TA–62. As will be seen from FIGURE 13 and as explained in the descriptive parts thereof, the front tool of the cross slide is programmed as shown so that there will be response to the RAPID-IN FEED TRAVERSE-OUT cycle.

Referring again to FIGURE 15, the output of TA–65 at line 140 is at zero pressure and as such allows TA–62 to send an output signal in line 143 to TA–57, shutting OFF TA–57. As described previously when a signal such as C–11 is put into TA–57, this triggers the whole rear tool cycle. While this has been described as being selective from front to rear, it is clear that either front or rear tool may be programmed for one to proceed the other and vice versa for any selected face or faces of the turret.

Simultaneous functioning of the turret slide and the cross slide is indicated on the panel 28 as function C–9 which of course can be programmed for any face or faces of the turret.

Referring to FIGURE 12, it will be clear that TA–49 and TA–50 are OFF when the cross slide is stopped on PARK position, as indicated by cam K–12 and that there is no output from TA–49 and TA–50 under these conditions.

Referring again to FIGURES 13, 14 and 15, it is shown that when the cross slide is operating, line 131 is at zero pressure which permits outputs from TA–49 and TA–50 to deliver fluid pressure to TA–17 which, as shown in FIGURE 7, has a normally zero pressure output. Since it is shown in FIGURE 7 that it is necessary to obtain a signal from TA–17 to shift the circuitry for turret slide RAPID FORWARD, it is clear that the turret slide is effectively locked against FORWARD motion while the cross slide is in operation.

By programming C–9 to deliver a signal to TA–49 and TA–50, fluid pressure input will be cut OFF from TA–17. This permits the turret slide to go through its programmed cycle simultaneously with the programmed cycle of the cross slide, as explained hereinbefore.

In order to provide for backfeed for the forward and rear tool of the cross slide, there is provided an ON-OFF valve 183 for programming the backfeed for the rear tool of the cross slide and an ON-OFF valve 184 for controlling the backfeed for the front tool. When forward ON-OFF valve 184 is depressed, fluid pressure flow will be established from line 164 through the valve and line 185 to TA–85. In FIGURE 15, the output of TA–85 is indicated as a momentary signal which shifts the front tool to RAPID TRAVERSE but since with an input from line 185 to TA–85, there can be no signal output from TA–85 which therefore prevents the front tool from going into RAPID TRAVERSE which permits backfeed to take place. Continuing backfeed will cause cam K–13 to depress limit valve LV–13 which cuts OFF fluid pressure supplied to TA–76 and TA–78. As shown in this figure, there is an input signal to TA–78 which will be prevented from turning on but, on the other hand, TA–76 will have an output pressure in line 186 which is directed to TA–80 and TA–81 where the resultant effect of this has already ben described. At the end of this sequence, the slide will return to PARK position as shown in FIGURE 12.

In a similar manner, when the operator depresses ON-OFF switch 184 which controls the backfeed of the forward tool, the functioning of this operation is readily obvious from FIGURE 15 in connection with the previously given description of the cycle of the rear tool.

*Manual operation*

FIGURES 7 through 11 which have been devoted to the circuitry primarily in connection with the programming and automatic operation of the turret slide, will now be referred to for description of the manual operation of the turret slide.

To distinguish from automatic operation which derives its signal pressure system from manifold 57, for manual operation manifold 187 derives its fluid pressure from line 137 and through selector valve 56 which in FIGURE 7 is shown in full lines to supply fluid pressure to manifold 57, but in dotted lines is shown supplying fluid pressure to manual manifold 187. An output line 188 from manifold 187 delivers fluid pressure to selector valve 189 which is shown in open position and supplies fluid pressure through line 190 to TA–19 and TA–20. As previously described, the signal to TA–19 and TA–20 will shift the turret forward. When valve 189 is in the dotted line position, fluid pressure is supplied through line 191 to turn both of these units to OFF or zero position which allows TA–41 to turn OFF and supply fluid pressure through line 125 to TA–21 which puts the turret slide in RETURN, as shown and described in connection with FIGURE 9. Although not shown in FIGURE 7, there is an output of manifold 187 to TA–12 which has an input at 192. The input from 192 to TA–12 will shut OFF TA–12 and, as previously described in connection with FIGURE 11, will cause the turret to stop. When the operator depresses ON-OFF valve 193, fluid pressure is supplied through line 194 for delivery to TA–10 and TA–11 which will remain OFF as long as this valve is depressed. With TA–10 and TA–11 OFF, either TA–26 or TA–27 will provide signal pressure output as determined by the position of the selector valve 189 which selects the direction of movement of the slide and consequently the slide will move in the direction selected.

Under these conditions, further operation of the turret slide will be carried out in accordance with the program selected. However, when the operator releases ON-OFF valve 193, manual operation is terminated. LV–7, LV–8 and LV–9 are inactive during manual operation.

Selector valve 195 which also derives its fluid pressure from manual manifold 187 (solid line position) supplies fluid pressure to line 196 to TA–13 and TA–14 which allows TA–30 to turn ON. As previously described, this releases the brake and the spindle will be allowed to run freely. When selector valve 195 is switched to dotted line position, fluid pressure is delivered to line 197 which is delivered to TA–30, turning TA–30 OFF which serves to apply the brake as has been previously described.

Referring to FIGURES 13, 14 and 15 which illustrate the fluidic-pneumatic circuitry for operating the cross slide, selector valve 198 derives fluid pressure from the manual manifold 187, as indicated in these figures and in the position shown in full lines delivers fluid pressure through line 199 from TA–67. This input to TA–67 shifts the circuit to allow the slide to move IN, as shown and described in FIGURE 13. When valve 198 is shifted to dotted line position, a signal will be delivered through line 200 to TA–68 which will shift the cross slide to move OUT, as shown in FIGURE 15 in connection with the automatic operation. It is to be noted that TA–58 and TA–59 both have inputs from manual manifold 187. These inputs will hold TA–58 and TA–59 OFF so that there can be no output from them during manual operation.

TA–51 also has an input from manifold 187. This will keep this unit OFF during manual operation. As previously described, with this unit OFF, the cross slide is stopped as explained in connection with FIGURE 12.

ON-OFF valve 201 is also provided with fluid pressure from manual manifold 187 through line 202 and when the valve is depressed manually against the compression of its spring, fluid pressure will be delivered to TA–52 and TA–53 through line 203 which turns OFF these two units and, as previously described, this allows the slide to move in a direction determined by the position of valve 198. As soon as the valve 201 is released, the action just described is terminated. ON-OFF valve 204 is also supplied from manifold 187 through line 202 with fluid pressure which, when manually depressed delivers fluid pressure through line 205 to TA–81 and TA–80. As previously described, with TA–80 and TA–81 OFF, this will shift the circuitry to cross slide RAPID TRAVERSE since the feed and traverse of the cross slide under manual control is merely the same as the automatic operation except that valve 204 is provided for overriding the cross slide feed to provide RAPID TRAVERSE.

Selector valve 206 also derives fluid pressure through line 207 from manifold 187 and in the position shown in solid lines delivers fluid pressure to line 208 and thence to TA–45 and TA–46 which allows TA–47 to turn ON to deliver its output signal to open the collet, as has been previously shown and described.

In the dotted line position of selector valve 206, fluid pressure will be delivered through line 209 to TA–47 to turn its signal OFF thereby closing the collet.

From the above, it will be evident that by virtue of this invention, in machine tools such as turret lathes, boring mills, milling machines and hobbing machines equipped with indexible tool or work holders, main and/or cross slides, and means for establishing forward rapid, feed and return rapid movements in one or both such elements, the construction, cost, operation and maintenance of such machines are greatly simplified. The operation, which may be fully automatic or manual, is extremely flexible and is rendered safe and substantially free of damage or breakdown by jamming or otherwise due to careless programming by an operator. The cost of construction and maintenance as compared with that of fully electrically or hydraulically actuated machines is materially less, due to the application of low pressure fluidic signals as a means for controlling intermediate pneumatic circuits which, in turn, control the application of high hydraulic pressures to actuate mechanical mechanisms such as tool slides, cross slides, work holders or spindles, collet mechanisms, HI-LO clutch mechanisms, spindle brake, etc.

Flexibility in operation is assured by the provision of a central control panel containing selective control means for programming the machine, not only to select the tool position with respect to the work, such as turret and turret indexing means, but also to select any working function which may be assigned to be carried out in a preselected sequence.

Maintenance of smooth operation is assured by easy access to the mechanical working mechanisms as well as to the selector and control panel and the fluidic relays, jet amplifiers, pilot valves and such elements forming part of the fluidic circuitry.

We claim:
1. In a machine tool having a work holder, a multiple tool carrier having relative movement along the axis of the work holder for forward rapid traverse, feed and return-rapid relative to said work holder, said carrier and holder being relatively indexible, and means for relatively indexing the carrier and holder, the combination of a fluid pressure means for actuating said holder, said tool carrier and said indexing means, said fluid pressure means comprising a controlled source of substantially constant relatively low pneumatic fluid pressure of the order of 1 p.s.i., or less, a controlled source of relatively higher pneumatic fluid pressure, a plurality of fluidic relay means connected with said relatively higher pressure source and responsive to preselected fluidic signals from said low pressure source for controlling a higher pressure output from selected relay means, selector means connected with said low pressure source for sequentially preselecting and positioning a working position of the carrier with respect to the axis of the holder, a power source for imparting relative movement between the carrier and holder in forward rapid traverse, feed and return-rapid, and fluid jet amplifying means responsive to higher pressure outputs of certain of said relay means for supplying power from said power source to actuate said tool carrier.

2. In a machine tool having a driven work spindle, a tool slide having movement along the axis of the spindle for forward rapid traverse, feed and return-rapid relative to said spindle, an indexible turret carried by the slide and means for indexing the turret, the combination of a fluid pressure means for actuating said spindle, said tool slide and said indexing means, said fluid pressure means comprising a controlled source of substantially constant relatively low pneumatic fluid pressure of the order of 1 p.s.i., or less, a controlled source of relatively higher pneumatic fluid pressure, a plurality of fluidic relay means connected with said relatively higher pressure source and responsive to preselected fluidic signals from said low pressure source for controlling a higher pressure output from selected relay means, selector means connected with said low pressure source for sequentially preselecting and positioning a working face of the turret with respect to the axis of the spindle, a power source for actuating said tool slide in performing selected movements thereof, and fluid jet amplifying means responsive to higher pressure outputs of certain of said relay means for supplying power from said power source to actuate said tool slide.

3. In a machine tool having a driven work spindle, a tool slide having movement along the axis of the spindle for forward rapid traverse, feed and return-rapid relative to said spindle, an indexible turret carried by the slide and means for indexing the turret, the combination of a fluid pressure means for actuating said spindle, said tool slide and said indexing means, said fluid pressure means comprising a controlled source of substantially constant relatively low pneumatic fluid pressure of the order of 1 p.s.i., or less, a controlled source of relatively higher pneumatic fluid pressure, a plurality of fluidic relay means connected with said relatively higher pressure source and responsive to preselected fluidic signals from said low pressure source for controlling a higher pressure output from selected relay means, selector means connected with said low pressure source for sequentially preselecting and positioning a working face of the turret with respect to the axis of the spindle, turret face selector valve means associated with said selector means and carried by said slide and operable by movement of the slide and in response to said face preselecting means to index the selected faces to working position in a selected sequence, a power source for actuating said tool slide in performing selected movements thereof, and fluid jet amplifying means responsive to higher pressure outputs of certain of said relay means for supplying power from said power source to actuate said tool slide.

4. In a machine tool having a driven work spindle, a tool slide having movement along the axis of the spindle for forward rapid traverse, feed and return-rapid relative to said spindle, a cross slide movable in a direction transverse to the axis of the spindle and a tool holder on one end of the cross slide, an indexible turret carried by the slide and means for indexing the turret, the combination of a fluid pressure means for actuating said spindle, said tool slide, cross slide and said indexing means, said fluid pressure means comprising a controlled source of substantially constant relatively low pneumatic fluid pressure of the order of 1 p.s.i., or less, a controlled source of relatively higher pneumatic fluid pressure, a plurality of fluidic relay means connected with said relatively higher pressure source and responsive to preselected fluidic signals from said low pressure source for controlling a higher pressure output from selected relay means, selector means connected with said low pressure source for sequentially preselecting and positioning a working face of the turret with respect to the axis of the spindle, said cross slide having movement in forward rapid, feed and rapid return with respect to a workpiece in the spindle and transversely thereof, a power source for actuating said tool slide and said cross slide in performing selected movements thereof, and fluid jet amplifying means responsive to higher pressure outputs of certain of said relay means for supplying power from said power source to selectively actuate said slides.

5. A fluidic system for correlating and controlling functions of movable elements of a machine tool for carrying out a preselected cycle of operation of said elements, said elements including a driven spindle, a turret slide, an indexible turret on the slide, a cross slide, a tool holder on the cross slide, a spindle collet, and a spindle brake, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom and thereby activate those of the said movable elements in a preselected cycle correlated with a preselected working face of the turret.

6. A fluidic system for correlating and controlling functions of movable elements of a machine tool for carrying out a preselected cycle of operation of said elements, said elements including a driven spindle, a turret slide, an indexible turret on the slide, a spindle collet, and a spindle brake, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom and thereby activate those of the said movable elements in a preselected cycle correlated with a preselected working face of the turret.

7. The invention defined in claim 6 in which the selector means comprises a remote fluid control and distribution center having connection with said sources of pneumatic fluid pressure, and a plurality of series of fluid distribution control means, said last named means consisting of a first series of control valves arranged in a substantially linear consecutive order and a second series of control valves arranged in a substantially linear order, the several valves of one order selectively controlling fluid flow corresponding to each of the several working faces of said indexible turret, and the valves of the other of said linear orders selectively controlling fluid flow corresponding to each of a plurality of selected functions to be performed by the selected movable elements of the machine.

8. The invention defined in claim 7 in which projected coordinates of a selected valve of one series and the selected valve of the other series intersect to establish the selected function of a movable member relative to the selected working face of the turret.

9. The invention defined in claim 6 including a rotatable turret working face selector mounted on said turret slide, a stop screw roll rotatable with said face selector, a plurality of stop screws carried by said roll equivalent in number to the number of working faces of the turret, a series of adjustable cams on said turret slide, a plurality of limit valves engageable respectively by said cams in response to movement of said slide and connected with said low pressure fluid source, and in which the selector means comprises a remote fluid control and distribution center having connection with said sources of pneumatic fluid pressure, and a plurality of series of fluid distribution control means, said last named means consisting of a first series of control valves arranged in a substantially linear consecutive order and a second series of control valves arranged in a substantially linear order, the several valves of one order selectively controlling fluid flow corresponding to each of the several working faces of said indexible turret, and the valves of the other of said linear orders selectively controlling fluid flow corresponding to each of a plurality of selected functions to be performed by the selected movable elements of the machine.

10. A fluidic system for correlating and controlling functions of movable elements of a machine tool for carrying out a preselected cycle of operation of said elements, said elements including a driven spindle, a turret slide, an indexible turret on the slide, a cross slide, front and rear tool holders on the cross slide, a spindle collet, and a spindle brake, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom and thereby activate those of the said movable elements in a preselected cycle correlated with a preselected working face of the turret.

11. A fluidic system for correlating and controlling functions of movable elements of a machine tool for carrying out a preselected cycle of operation of said elements, said elements including a driven spindle, a turret slide, an indexible turret on the slide, a cross slide, front and rear tool holders on the cross slide, a spindle collet, and a spindle brake, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom and thereby activate those of the said movable elements in a preselected cycle correlated with a preselected working face of the turret, said cross slide having forward, feed and return travel in response to predetermined low pressure fluidic signals delivered from said selector means.

12. A fluidic system for correlating and controlling functions of movable elements of a machine tool for carrying out a preselected cycle of operation of said elements, said elements including a driven spindle, a cross slide, a tool holder on the cross slide, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom to thereby impart rapid forward, feed and return rapid movements to said cross slide.

13. A fluidic system for correlating and controlling functions of movable elements of a machine tool for carrying out a preselected cycle of operation of said elements, said elements including a driven spindle, a cross slide, a front tool holder and a rear tool holder in said cross slide, said system comprising a controlled source of relatively low substantially constant pneumatic fluid pressure of 1 p.s.i., or less, a controlled source of relatively higher pneumatic fluid pressure, a plurality of fluidic relay means connected with said higher pressure source and responsive to preselected fluidic signals from the low pressure source for controlling a higher pressure output from selected relay means, selector means connected with said low pressure source for distribution of a low pressure fluidic signal to selected relays to effect a response of selected relay means in controlling delivery of a higher fluid pressure output therefrom to thereby impart rapid forward, feed and return movements to said cross slide in either of opposed directions.

14. In a machine tool, a tool holder, a work holder, said holders being relatively movable to perform a work operation on a workpiece in the work holder, means for relatively moving and indexing one of said holders to a preselected position with respect to said other holder, means to impart forward, feed and return relative movements to said holders, said last named means including a pneumatic fluidic system comprising a controlled source of substantially constant relatively low pneumatic fluid pressure of the order of 1 p.s.i., or less, a controlled source of relatively higher pneumatic fluid pressure, a plurality of fluidic relay means connected with said relatively higher pressure source and responsive to preselected fluidic signals from said low pressure source for controlling a higher pressure output from selected relay means, a selector valve connected with said low pressure source for distribution of a low pressure fluidic signal to said indexing means to effect an indexed position of said one holder with respect to the other holder.

References Cited
UNITED STATES PATENTS

| 3,224,070 | 12/1965 | Cunningham | 29—42 |
| 2,934,512 | 5/1960 | Allen | 29—42 |
| 3,113,371 | 12/1963 | Spohn | 29—42 |

RICHARD H. EANES, Jr., *Primary Examiner.*

U.S. Cl. X.R.

29—130, 132, 148.4; 95—89